United States Patent
Oida et al.

(10) Patent No.: US 8,312,498 B2
(45) Date of Patent: Nov. 13, 2012

(54) DIGITAL BROADCAST RECEPTION APPARATUS, INFORMATION CONTENT PRINTING METHOD IN THE APPARATUS, PRINT APPARATUS COMMUNICATING WITH THE APPARATUS, AND CONTROL METHOD THEREOF

(75) Inventors: Jun Oida, Kawasaki (JP); Eri Kanai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 12/065,030

(22) PCT Filed: Aug. 28, 2006

(86) PCT No.: PCT/JP2006/316897
§ 371 (c)(1),
(2), (4) Date: Feb. 27, 2008

(87) PCT Pub. No.: WO2007/026658
PCT Pub. Date: Aug. 3, 2007

(65) Prior Publication Data
US 2009/0288128 A1  Nov. 19, 2009

(30) Foreign Application Priority Data

Aug. 31, 2005 (JP) .................................. 2005-252717

(51) Int. Cl.
*H04N 7/173* (2006.01)
*H04N 7/16* (2011.01)
(52) U.S. Cl. ....................................... 725/112; 725/136
(58) Field of Classification Search .................. 725/112, 725/136
See application file for complete search history.

(56) References Cited

U.S. PATENT DOCUMENTS

| 5,774,664 | A | * | 6/1998 | Hidary et al. | 725/110 |
|---|---|---|---|---|---|
| 5,929,848 | A | * | 7/1999 | Albukerk et al. | 715/700 |
| 6,483,983 | B1 | * | 11/2002 | Takahashi et al. | 386/230 |
| 6,802,078 | B2 | * | 10/2004 | Tachikawa | 725/110 |
| 6,870,571 | B1 | * | 3/2005 | Narushima et al. | 348/552 |
| 6,922,693 | B1 | * | 7/2005 | Rubin et al. | 1/1 |
| 7,281,272 | B1 | * | 10/2007 | Rubin et al. | 726/26 |
| 2001/0000265 | A1 | * | 4/2001 | Schreiber et al. | 713/201 |

(Continued)

FOREIGN PATENT DOCUMENTS

JP 4-334287 11/1992

(Continued)

OTHER PUBLICATIONS

International Preliminary Report on Patentability and Dec. 5, 2006 International Search Report in PCT/JP2006/316897.

(Continued)

*Primary Examiner* — James R Sheleheda
(74) *Attorney, Agent, or Firm* — Fitzpatrick, Cella, Harper & Scinto

(57) ABSTRACT

A digital television (101) which allows the user to view a digital broadcast program receives a digital broadcast signal, and outputs it on the display screen. The digital television sequentially stores print information of the broadcast program in response to a predetermined output instruction during viewing of the broadcast program. The digital television transmits the stored print information to a printer in response to a print start instruction after the predetermined output instruction. In this way, the digital television sequentially saves print data of the broadcast program that the user is viewing, allows the user to select required data later, and can print the selected data all together.

8 Claims, 31 Drawing Sheets

U.S. PATENT DOCUMENTS

| | | | |
|---|---|---|---|
| 2003/0084462 A1 | 5/2003 | Kubota et al. | 725/153 |
| 2004/0028382 A1* | 2/2004 | Choi et al. | 386/68 |
| 2004/0103436 A1* | 5/2004 | Shikata et al. | 725/83 |
| 2004/0123314 A1* | 6/2004 | Bova | 725/32 |
| 2005/0091698 A1* | 4/2005 | Shikata | 725/132 |
| 2005/0091700 A1* | 4/2005 | Ohno et al. | 725/133 |
| 2005/0243207 A1* | 11/2005 | Narushima et al. | 348/552 |
| 2007/0028270 A1* | 2/2007 | Ostojic et al. | 725/53 |
| 2009/0135445 A1* | 5/2009 | Tateyama | 358/1.15 |
| 2009/0288128 A1* | 11/2009 | Oida et al. | 725/112 |

FOREIGN PATENT DOCUMENTS

| | | |
|---|---|---|
| JP | 6-215443 | 8/1994 |
| JP | 2000-341630 | 12/2000 |
| JP | 2001-045435 | 2/2001 |
| JP | 2001-312499 | 11/2001 |
| JP | 2001-320637 | 11/2001 |
| JP | 2002-191031 | 7/2002 |
| JP | 2003-209797 | 7/2003 |
| JP | 2005-086329 | 3/2005 |
| JP | 2005-210408 | 8/2005 |
| JP | 2006-293779 | 10/2006 |

OTHER PUBLICATIONS

Apr. 3, 2008 International Preliminary Report on Patentability in PCT/JP2006/316897.

* cited by examiner

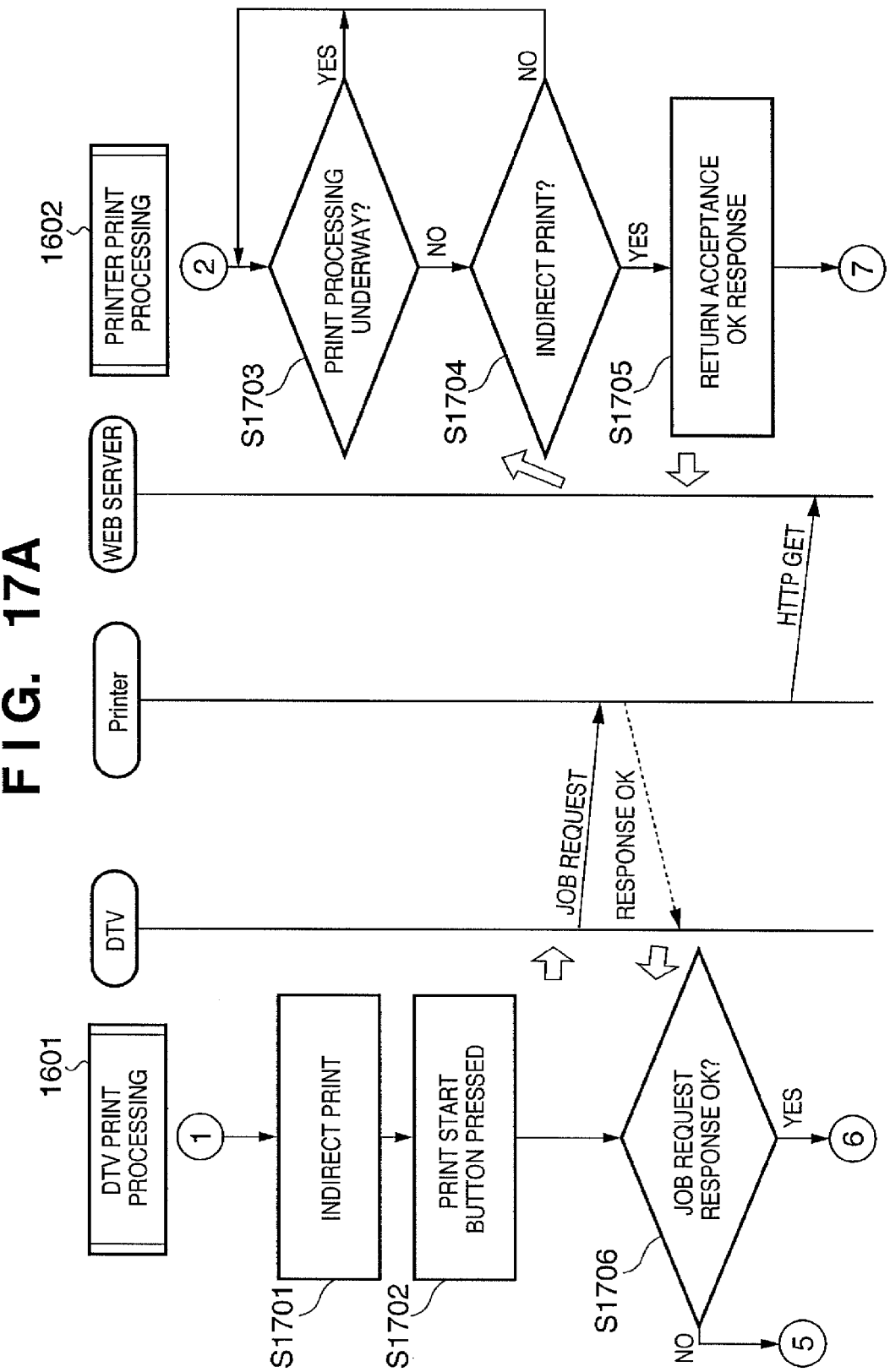

F I G. 19
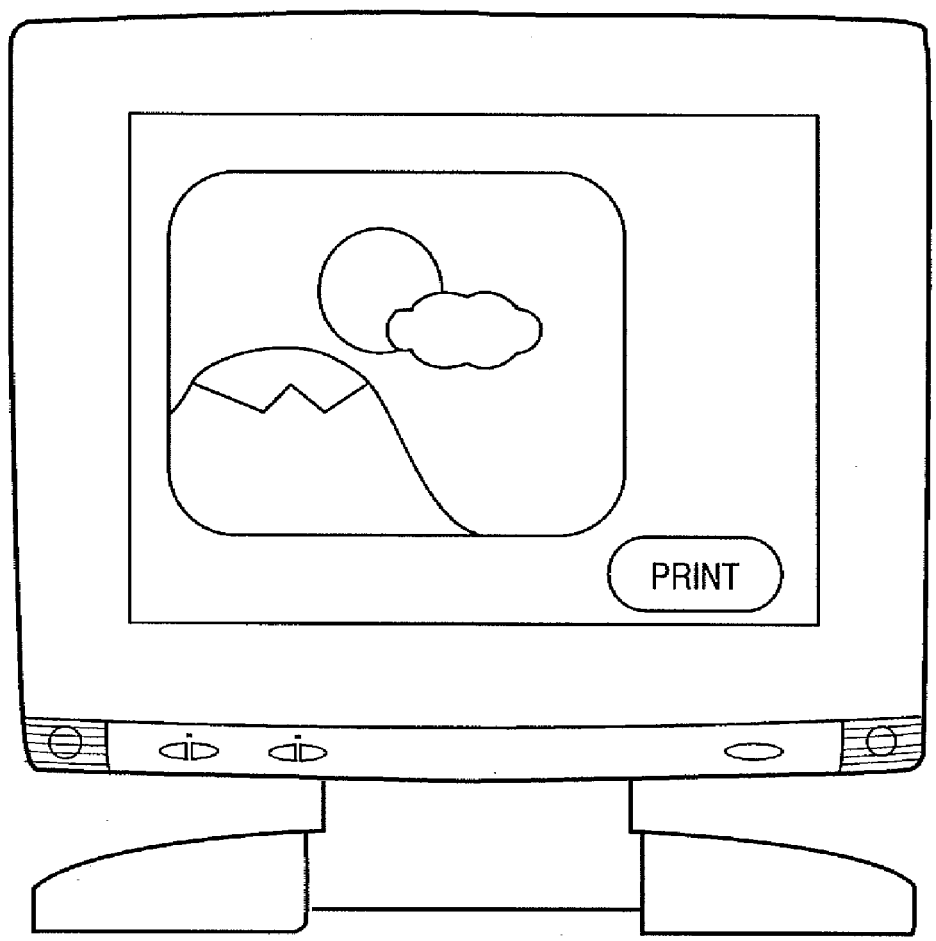

F I G. 20
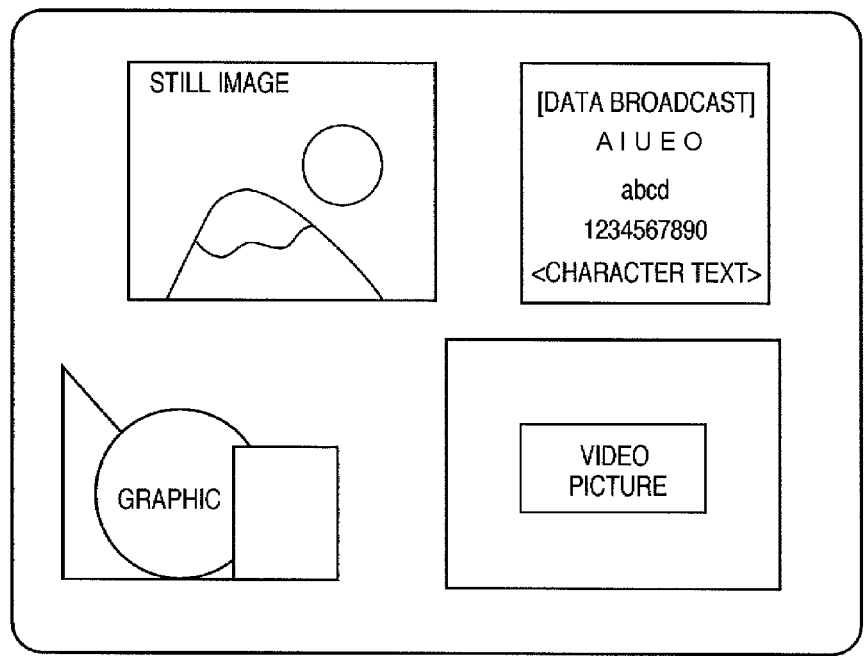

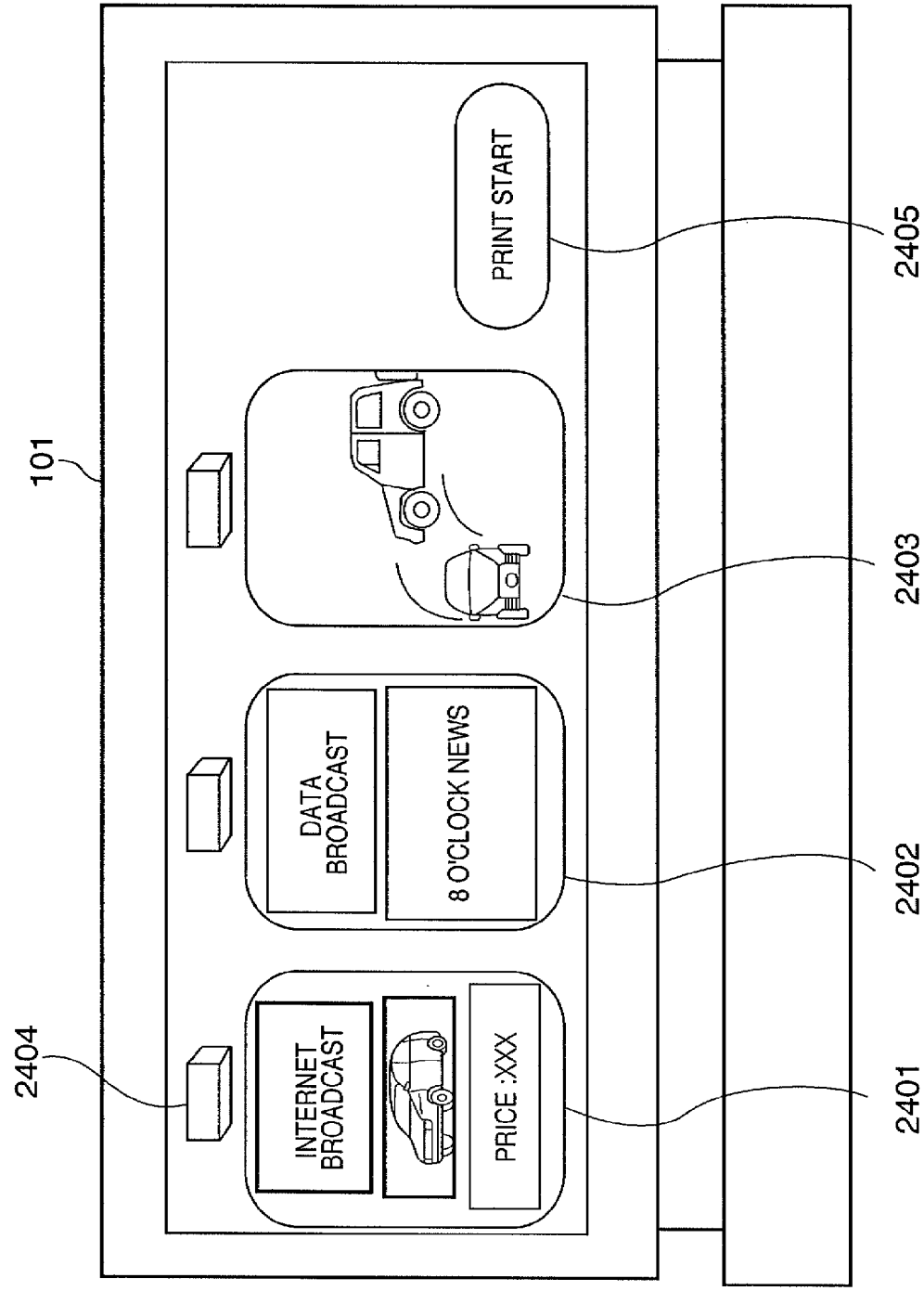

F I G. 25B
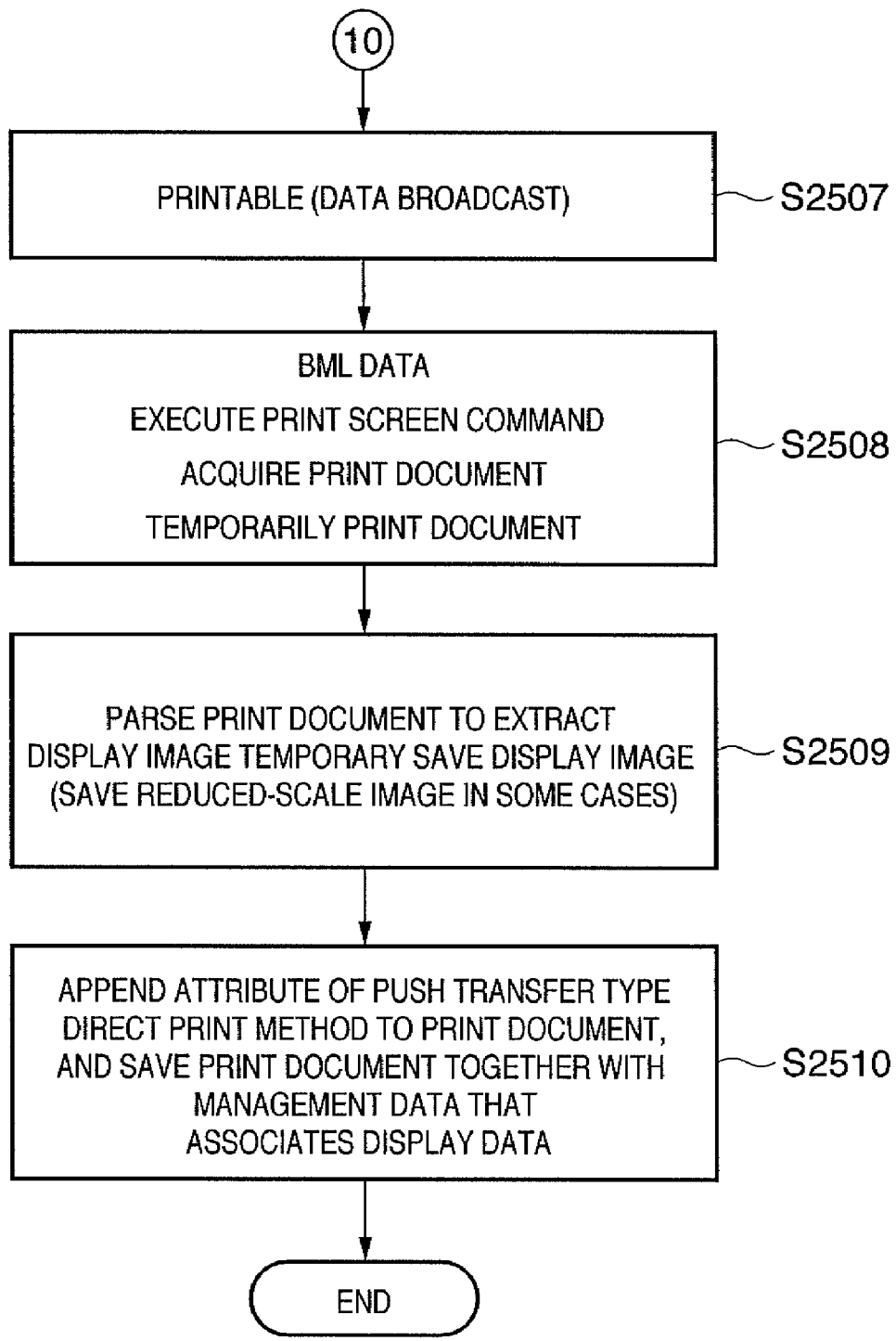

DIGITAL BROADCAST RECEPTION APPARATUS, INFORMATION CONTENT PRINTING METHOD IN THE APPARATUS, PRINT APPARATUS COMMUNICATING WITH THE APPARATUS, AND CONTROL METHOD THEREOF

TECHNICAL FIELD

The present invention relates to a printing technique of information content in a digital broadcast reception apparatus which allows the user to view a digital broadcast program.

BACKGROUND ART

In recent years, various electric home appliances in general home have been digitized, and are connected via a network.

In particular, as for televisions, digital broadcast televisions (to be abbreviated as DTVs hereinafter) have prevailed as digital broadcasting began. Such DTV can be connected to a network or to the Internet via a network router, so as to allow usage such as display of WEB sites on the television screen and the like.

In the aforementioned audio/visual (to be abbreviated as AV hereinafter) home network environment, in order to save video data and acoustic data from the DTV, a recording device such as a hard disk (HDD) recorder or the like is generally used.

By connecting a network printer, the contents displayed on the DTV can be printed, and an example that provides a print content unique to a broadcast program is disclosed (for example, see patent document 1).

Patent Document 1: Japanese Patent Laid-Open No. 2000-341630

DISCLOSURE OF INVENTION

In the conventional AV home network environment, an apparatus that saves video pictures and allows the user to save and print image display contents in a single broadcast program is already available, and the user can print screen display contents of various broadcast programs which are being displayed on the DTV. However, such an apparatus does not have a function of sequentially saving video pictures and images which are being displayed on the DTV as print data, allowing the user to select the data to be printed later, and printing the required data all together.

The present invention has been made in consideration of the above problems, and has as its object to implement a technique which sequentially saves video pictures and image display contents of various broadcast programs which are displayed on the DTV, allows the user to select the data to be printed later, and prints the required data all together.

In order to solve the aforementioned problems and to achieve the object, the present invention is directed to a digital broadcast reception apparatus which allows a user to view a digital broadcast program, comprising: output means for receiving a digital broadcast signal and outputting the received digital broadcast signal to a display screen; storage means for sequentially storing, as contents of print information of a broadcast program, one of link information which specifies a data supply source and image information generated from broadcast program viewing data in response to a predetermined output instruction during viewing of the broadcast program; transmission means for transmitting the print information stored in the storage means to a printer in response to a print start instruction after the predetermined output instruction; and print processing means for controlling the printer to execute index printing based on the print information stored in the storage means, wherein a video recording apparatus for recording the broadcast program is connected, and when the video recording apparatus is recording the broadcast program, the storage means stores, in the storage means, marking information required to extract still image data from video recording information recorded by the video recording apparatus in place of one of the link information and the image information, and the print processing means extracts still image data as information for printing from the video recording information recorded by the video recording apparatus using the marking information stored in the storage means.

The present invention is directed to an information content printing method in a digital broadcast reception apparatus which allows a user to view a digital broadcast program, comprising: an output step of receiving a digital broadcast signal and outputting the received digital broadcast signal to a display screen; a storage step of sequentially storing, as contents of print information of a broadcast program, one of link information which specifies a data supply source and image information generated from broadcast program viewing data in storage means in response to a predetermined output instruction during viewing of the broadcast program; a transmission step of transmitting the print information stored in the storage means to a printer in response to a print start instruction after the predetermined output instruction; and a print processing step of controlling the printer to execute index printing based on the print information stored in the storage means, wherein a video recording apparatus for recording the broadcast program is connected, and when the video recording apparatus is recording the broadcast program, the storage step stores, in the storage means, marking information required to extract still image data from video recording information recorded by the video recording apparatus in place of one of the link information and the image information, and the print processing step extracts still image data as information for printing from the video recording information recorded by the video recording apparatus using the marking information stored in the storage means.

The present invention is directed to a digital broadcast reception apparatus which is connectable to the Internet, and allows a user to view a digital broadcast program, comprising: output means for receiving a digital broadcast signal and outputting the received digital broadcast signal to a display screen; second output means for acquiring information on the Internet and outputting the acquired information to the display screen; and storage means for storing, in storage means, print information required to print a display image upon reception of a predetermined print operation, wherein upon reception of the predetermined print operation while Internet information is being displayed, the storage means stores, as the print information, a URI of a print content and an attribute indicating a pull type print scheme using the URI, upon reception of the predetermined print operation while a data broadcast of the digital broadcast signal is being displayed, the storage means stores a print document obtained by converting information of the data broadcast which is being displayed, and an attribute indicating a push type direct print scheme using the print document, and upon reception of the predetermined print operation while a program video picture of the digital broadcast signal is being displayed, the storage means stores, as the print information, a still image extracted by capturing the program video picture, and the attribute indicating the push type direct print scheme using the still image.

The present invention is directed to an information content printing method in a digital broadcast reception apparatus which is connectable to the Internet, and allows a user to view a digital broadcast program, comprising: an output step of receiving a digital broadcast signal and outputting the received digital broadcast signal to a display screen; a second output step of acquiring information on the Internet and outputting the acquired information to the display screen; and a storage step of storing, in storage means, print information required to print a display image upon reception of a predetermined print operation, wherein upon reception of the predetermined print operation while Internet information is being displayed, the storage step stores, as the print information, a URI of a print content and an attribute indicating a pull type print scheme using the URI, upon reception of the predetermined print operation while a data broadcast of the digital broadcast signal is being displayed, the storage step stores a print document obtained by converting information of the data broadcast which is being displayed, and an attribute indicating a push type direct print scheme using the print document, and upon reception of the predetermined print operation while a program video picture of the digital broadcast signal is being displayed, the storage step stores, as the print information, a still image extracted by capturing the program video picture, and the attribute indicating the push type direct print scheme using the still image.

According to the present invention, the user can sequentially save the screen display contents of various broadcast programs that he or she is viewing as print data, can select required data later, and can print them all together. In this way, for example, when the user finds a content that he or she is interested in while switching viewing channels during, for example, TV commercials, he or she can save print information by an easy operation without missing the latest information.

Other features and advantages of the present invention will be apparent from the following description taken in conjunction with the accompanying drawings. Note that the same reference numerals denote the same or similar components throughout the accompanying drawings.

BRIEF DESCRIPTION OF DRAWINGS

FIG. 17A is a flowchart showing the print processing of the indirect print method according to the embodiment of the present invention;

FIG. 19 is a view exemplifying a display screen of a print content of Internet broadcasting according to the embodiment of the present invention;

FIG. 20 is a view exemplifying a display screen of a still image of data broadcasting according to the embodiment of the present invention;

FIG. 24 is a view exemplifying a screen that displays an index view of saved print data according to the embodiment of the present invention;

FIG. 25B is a flowchart showing the print data saving processing according to the second embodiment.

DESCRIPTION OF REFERENCE NUMERALS

Figure 1:
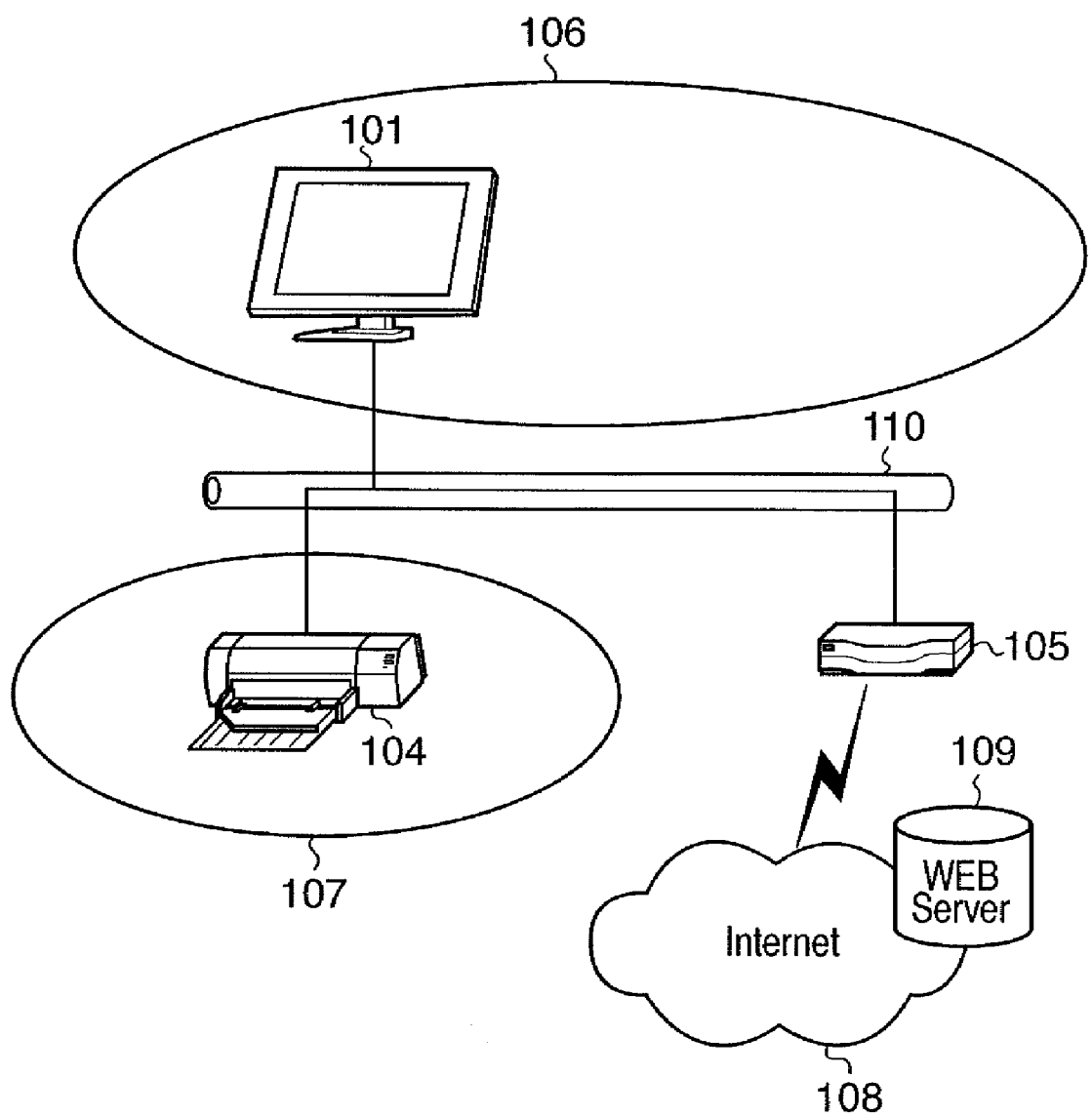
FIG. 1 is a view showing a connection example of devices in a home network environment according to an embodiment of the present invention.

101, 109: Digital television (host)
104, 106: Printer (network printer)
105: Broadband router 108: Internet
109: WEB server
110: Ethernet™
201: Network controller
202: Printer controller
203: Print media
204: Contents data
206: Image data
701: CPU
702: ROM
703: RAM
704: Digital broadcast reception controller
705: Antenna
706: UI processor (operation unit)
707: Output processor
708: Display/acoustic unit
709: Print processor
710: Network processor
712: Memory card connector
801: Demodulator
802: TS (Transport Stream)
803: Decoder
804: Video data
805: Audio data
806: Information (PSI/SI table)
807: DSM-CC
1801: Remote controller

BEST MODE FOR CARRYING OUT THE INVENTION

Embodiments according to the present invention will be described in detail hereinafter with reference to the accompanying drawings.

Note that embodiments to be described hereinafter are examples as implementation means of the present invention and should be appropriately modified or changed depending on the arrangement of an apparatus to which the present invention is applied and various conditions, and the present invention is not limited to the following embodiments.

First Embodiment

FIG. 1 is a view showing a connection example of devices in a home network environment according to the first embodiment of the present invention.

As a device that serves as a host 106, a digital broadcast television reception apparatus (DTV) 101 or the like is used. The DTV 101 is connected to a network printer 104 that serves as a printer 107 via an Ethernet™ 110 to be able to communicate with each other.

Respective devices connected to this Ethernet™ 110 can be connected to an Internet 108 via a broadband router 105. Hence, contents data on a WEB server 109 can be arbitrarily browsed.

Figure 2:
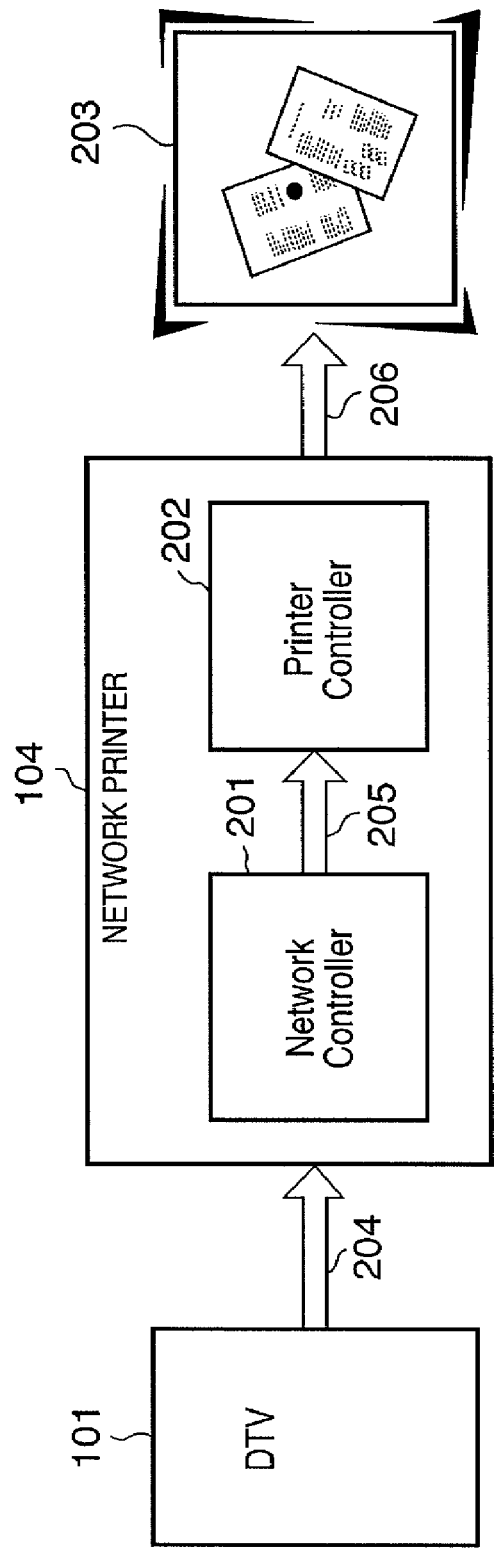
FIG. 2 is a diagram showing the arrangement of a print processing system according to the embodiment of the present invention.

FIG. 2 is a diagram showing the system arrangement of print processing according to this embodiment.

A personal computer (PC) with high processing performance is not used as the host 106, and the system is built by one-to-one connecting the DTV 101 and network printer 104. For this reason, generation of print data which is normally done by the host side using a printer driver is not executed. The host side generates print contents data in an XHTML format or uses data which is already prepared, and the printer side interprets the contents data to print it out.

The print processing of the system according to this embodiment will be described below.

The DTV 101 supplies print contents data 204 in the XHTML format to the network printer 104 via the Ethernet™ 110.

In the printer 104, a network controller interprets the contents data 204 input from the DTV 101, and generates print image data 205.

Furthermore, a printer controller 202 forms an output image (Output) 206 on print media 203 based on the print image data 205.

Respective functional modules which configure the network controller 201 will be described below.

Figure 3:
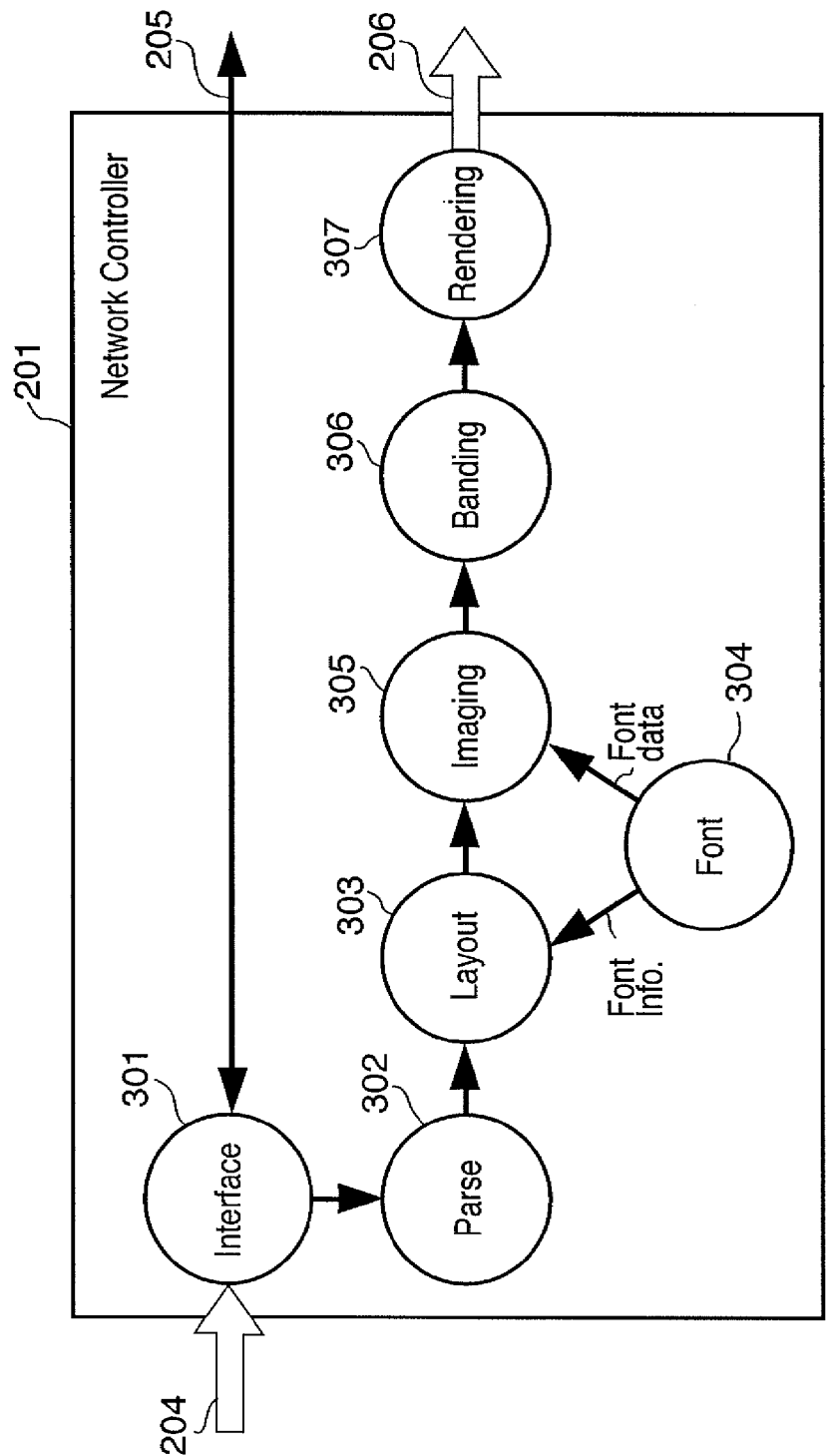
FIG. 3 is a chart showing an overview of software processing of a network controller according to the embodiment of the present invention.

FIG. 3 is a chart showing an overview of software processing of the network controller 201.

An interface 301 is a module which fetches the contents data 204 sent from the host 106 and passes the data to a parse processor (Parse) 302. The interface 301 also has a function of acquiring print statuses such as out of paper, run-out of ink, and the like, and notifying the host side of status information (Printer Status) 205.

The parse processor (Parse) 302 is a module which parses the contents data 204 described in XHTML. The contents data 204 is input as an "individual file format" or packaged "batch module format".

A layout processor (Layout) 303 is a module which creates syntax information parsed by the parse processor 302 as layout information data of print objects.

A font processor (Font) 304 is a module which creates and manages font data designated by the contents data 204. The font processor (Font) 304 is also called when font information (Font Info.) is acquired upon generation of the layout information data in the layout processor 303.

An imaging processor (Imaging) 305 is a module which decodes image data (e.g., JPEG data) in the print objects into RGB bitmap data, and executes resolution conversion for size adjustment.

A banding processor (Banding) 306 is a module which divides a rendering region into a plurality of bands, and makes a next rendering processor 307 execute rendering processing for respective bands.

The rendering processor (Rendering) 307 is a module which executes rendering processing based on the layout information data by the layout processing, and consequently outputs the print image data 206 in which respective color component pixels of a color image are configured by multi-valued data.

Respective functional modules which configure the printer controller 202 will be described below.

Figure 4:
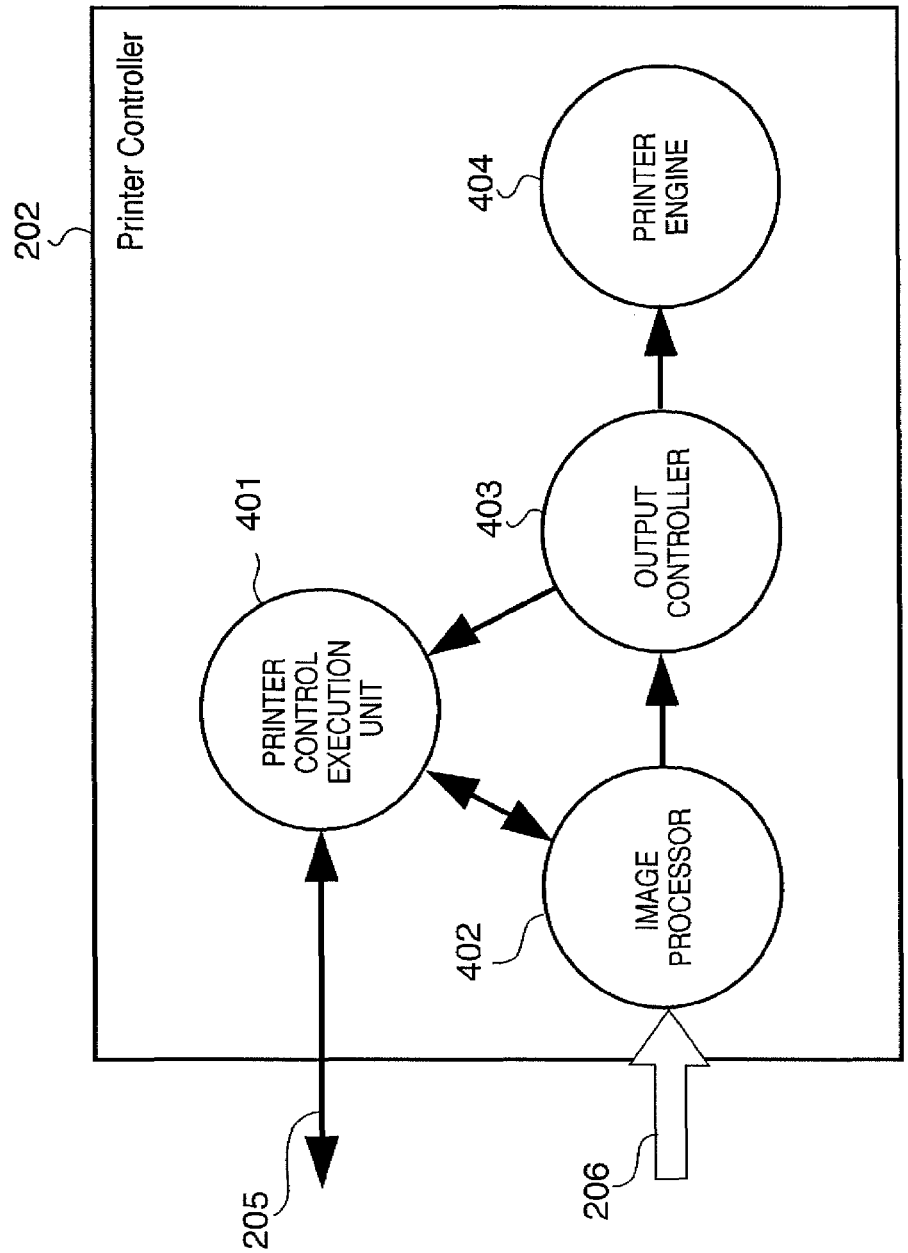
FIG. 4 is a chart showing an overview of software processing of a printer controller according to the embodiment of the present invention.

FIG. 4 is a chart showing an overview of software processing of the printer controller 202.

In this embodiment, the system is implemented using an inkjet printer. In such system, since the printer side does not execute any advanced image processing, a print image is rasterized on a memory space assured by this system, the rasterized image is converted into a format that the printer can directly print, and the converted image is sent to and printed by a printer engine.

A printer control execution unit 401 is a module which executes main control of the printer. The printer control execution unit 401 manages the operations of an image processor 402 and output controller 403, and monitors print execution statuses to output status information of the printer to the network controller 201.

The image processor 402 is a module which executes image conversion of the input image data 206 from multi-valued RGB data into binary YMCK data in correspondence with the output format to a printer engine 404. This conversion processing and the output to the printer engine 404 are done by optimally using the memory space by the banding processor 306. On the other hand, if a sufficient memory is mounted, an area on which data for one page can be rasterized may be assured.

The output controller 403 is a module which sequentially outputs the image data, which is output from the image processor 402 and is converted into the binary YMCK data as respective color data, in correspondence with the drive patterns of inkjet heads mounted on the printer engine 404.

The printer engine 404 mainly comprises heads each of which ejects ink in correspondence with image data, a carriage mechanism which scans a carrier on which the heads are mounted, and a printer movable part configured by a paper feed mechanism used to feed media (none of them are shown).

Figure 5:
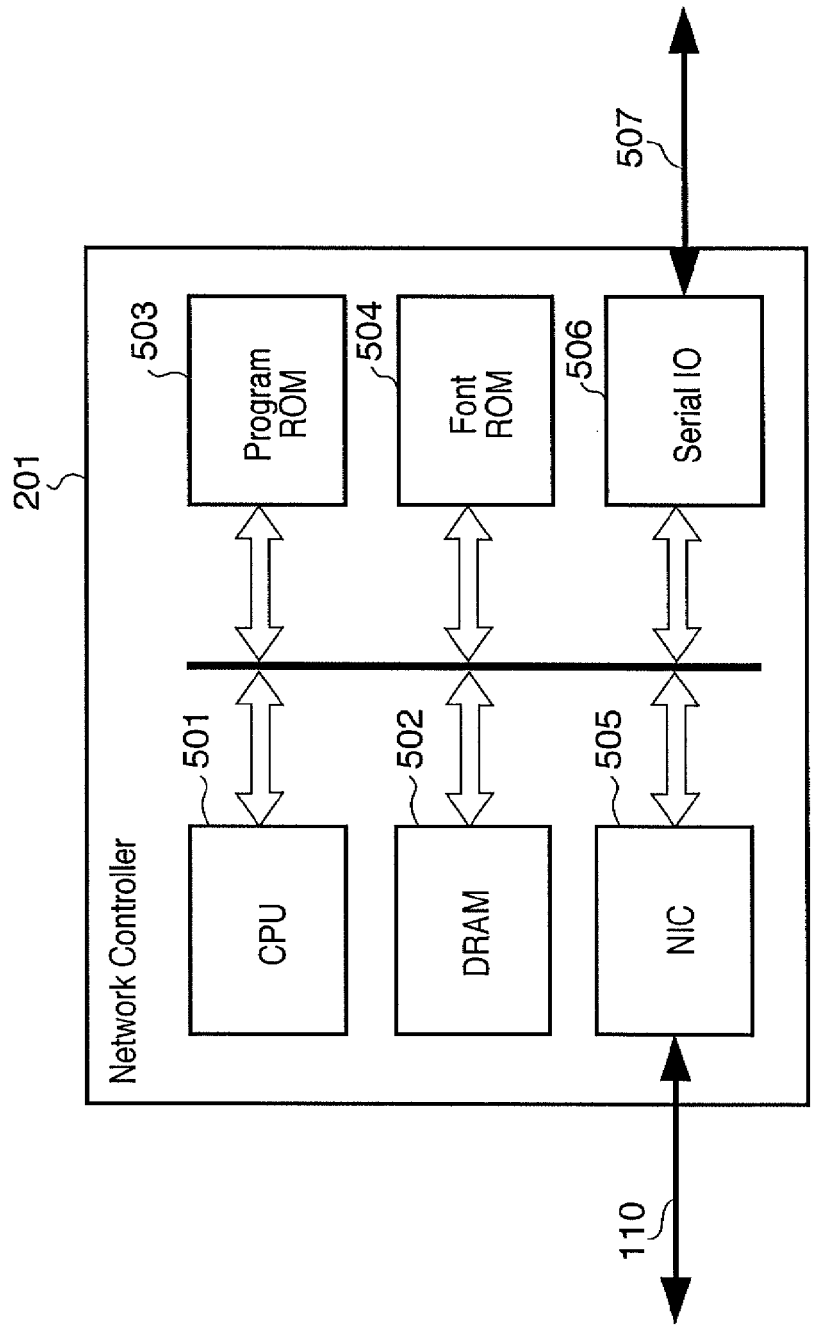
FIG. 5 is a block diagram showing the arrangement of the network controller according to the embodiment of the present invention.

FIG. 5 is a block diagram showing the internal structure of the network controller 201.

Referring to FIG. 5, reference numeral 501 denotes a CPU which makes main control. Reference numeral 502 denotes a DRAM which serves as a buffer memory and work memory for temporarily fetching the received contents data 204. Reference numeral 505 denotes a network interface controller (NIC) which communicates with the host 106 connected to the Ethernet™ 110. Reference numeral 503 denotes a program ROM in which execution programs are written. Reference numeral 504 denotes a font ROM in which font data are written. Reference numeral 506 denotes a serial IO used to communicate with the printer controller 202 via a serial interface (Serial I/F) 507. The aforementioned blocks are connected via an internal bus.

Figure 6:
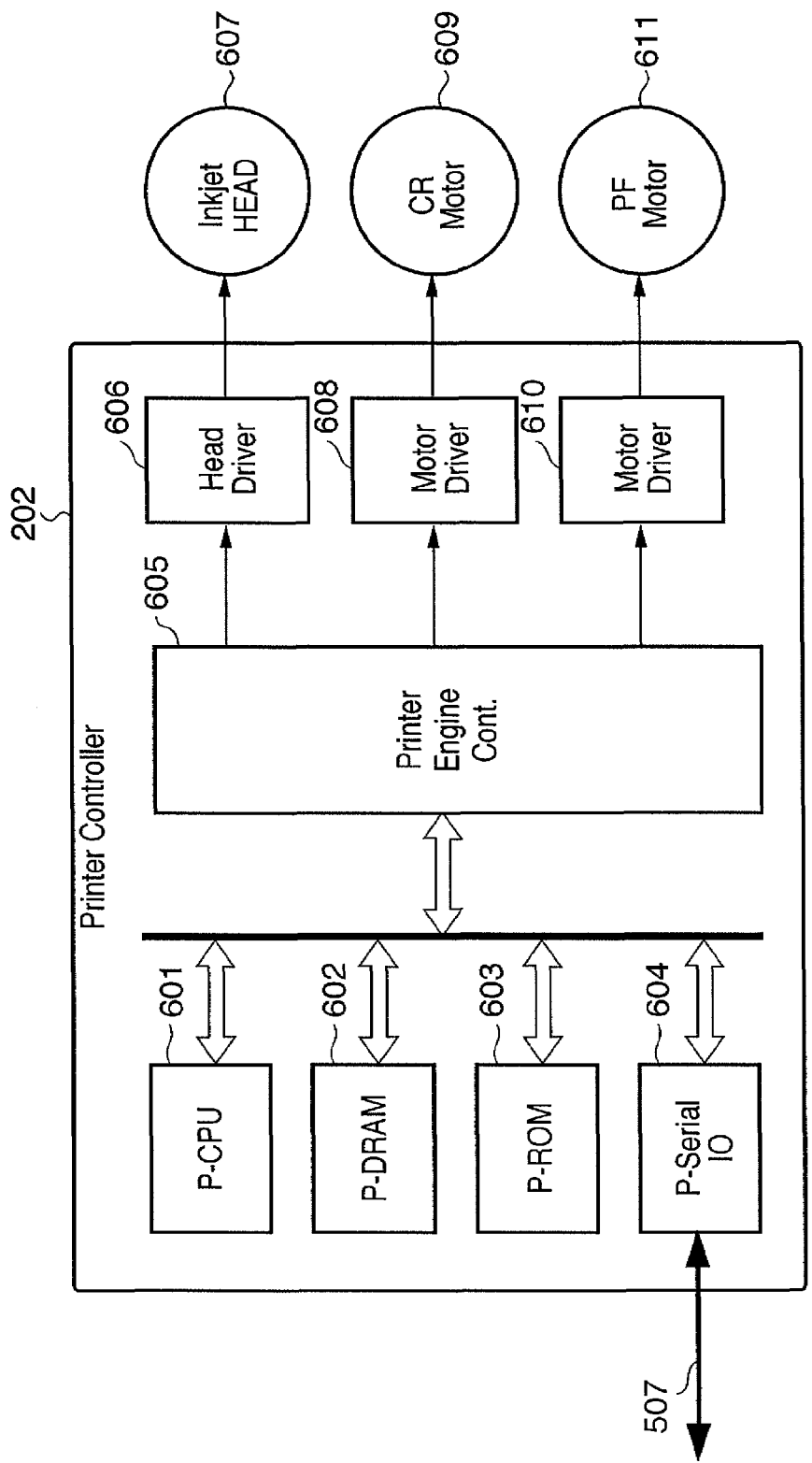
FIG. 6 is a block diagram showing the arrangement of the printer controller according to the embodiment of the present invention.

FIG. 6 is a block diagram showing the internal structure of the printer controller 202.

Referring to FIG. 6, reference numeral 601 denotes a P-CPU which makes main control. Reference numeral 602 denotes a P-DRAM which serves as a buffer memory and work memory for temporarily fetching the received image data 205. Reference numeral 603 denotes a P-ROM in which execution programs are written. Reference numeral 604 denotes a P-serial IO which communicates with the network controller 201 connected via the serial IO 506 and serial interface 507. The aforementioned blocks are connected to a printer engine controller 605 via an internal bus. Furthermore, the printer engine controller 605 is connected to a head driver 606 for driving inkjet heads 607, a motor driver 608 for driving a carriage motor 609, and a motor driver 610 for driving a paper feed motor 611.

<<Description of UPnP (Universal Plug and Play)>>

The UPnP is a peer-to-peer network which obviates the need for troublesome settings such as the settings of an IP address required to connect network devices, installation of device drivers, and the like (see the standardized specification for details).

The UPnP defines a device, service, and control point (CP). The device corresponds to UPnP compatible devices, that is, a printer, broadband router (Internet gateway device), and the like. The service is a minimum unit that represents a function provided by the device. For example, if the device is a printer defined by the UPnP Forum, a PrintBasic service is provided. The control point controls and uses the service of the device, and corresponds to the DTV or the like.

<<Arrangement of DTV>>

Figure 7:
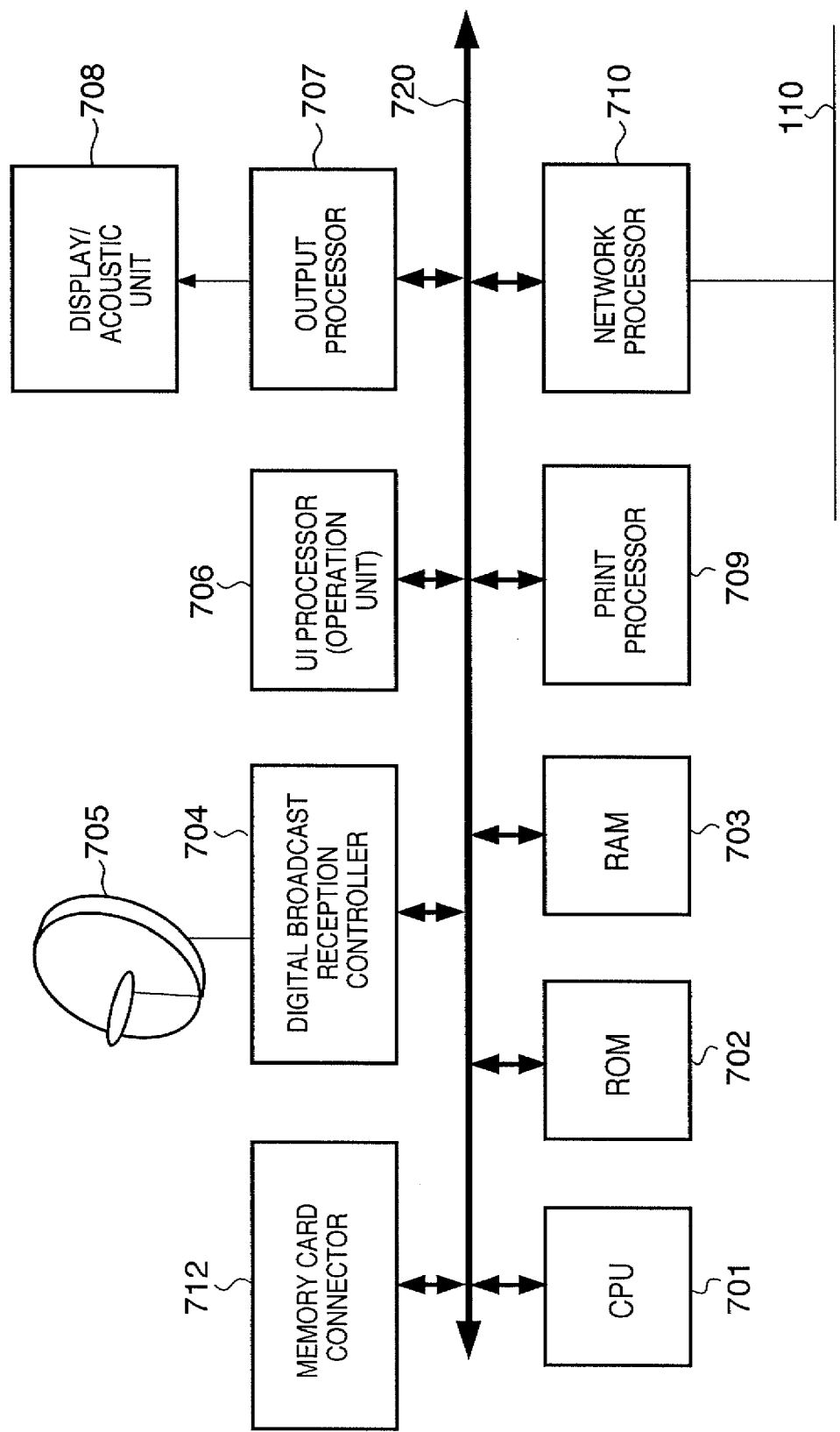
FIG. 7 is a block diagram showing the arrangement of a digital television according to the embodiment of the present invention.

FIG. 7 is a block diagram showing the internal arrangement of the DTV 101 of this embodiment.

Figure 18:
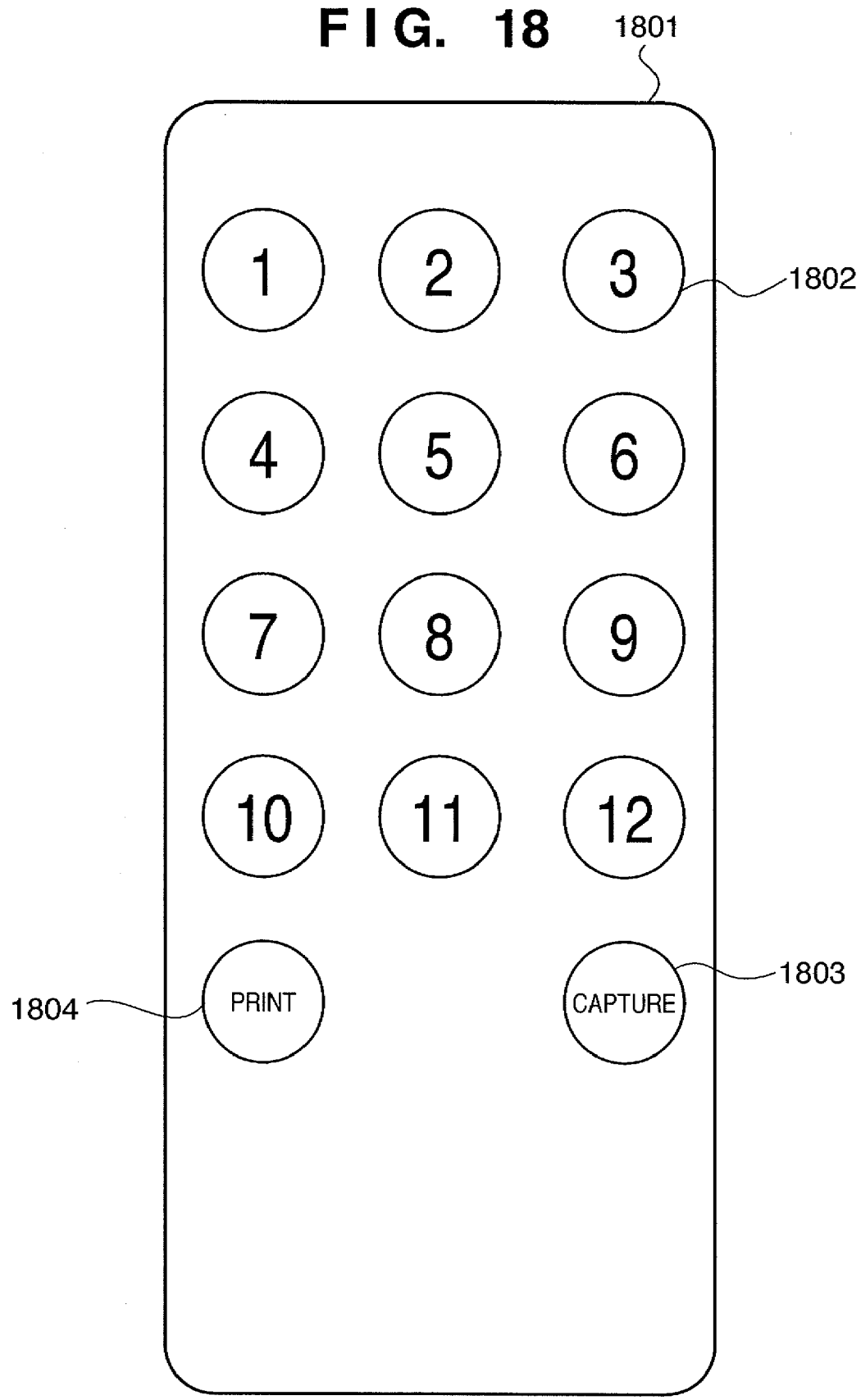
FIG. 18 is a view showing a remote controller according to the embodiment of the present invention.

Referring to FIG. 7, reference numeral 701 denotes a CPU which does the main control. Reference numeral 702 denotes a ROM as a read-only memory which stores programs and the like. Reference numeral 703 denotes a RAM as a temporary saving memory. Reference numeral 704 denotes a digital broadcast reception controller which fetches a digital broadcast signal received by an antenna 705, and decodes it to audio/video/image/data. Reference numeral 706 denotes a UI (user interface) processor (operation unit) which displays operation icons of, for example, operation buttons and the like on the television screen, and allows the user to make related operations using a remote controller 1801 (not shown in FIG. 7) to be described later with reference to FIG. 18.

Reference numeral 707 denotes an output processor for outputting audio/video/image/data to a display/acoustic unit 708 including a display screen, loudspeaker, and the like. Reference numeral 709 denotes a print processor which issues a print instruction to a printer or the like connected via the Ethernet™ 110. Reference numeral 710 denotes a network processor which executes communication processing with an external device connected to a network line of the Ethernet™ 110. Reference numeral 712 denotes a memory card connector, which connects a memory card or the like which saves images captured by a digital camera or the like to allow the display/acoustic unit 708 to play back images. Reference numeral 720 denotes a bus line which connects the aforementioned blocks.

As the Internet broadcast, the WEB server 109 on the Internet 108 in FIG. 1 delivers a broadcast content to the DTV 101 via the router 105 and Ethernet™ 110.

The video/audio data of the broadcast content are sent on TCP/IP, and are played back in the DTV 101. Other communication protocols in the Internet broadcast include RTP/RTCP, RTSP/SAP, and HTTP although their details will not be described.

Figure 8:
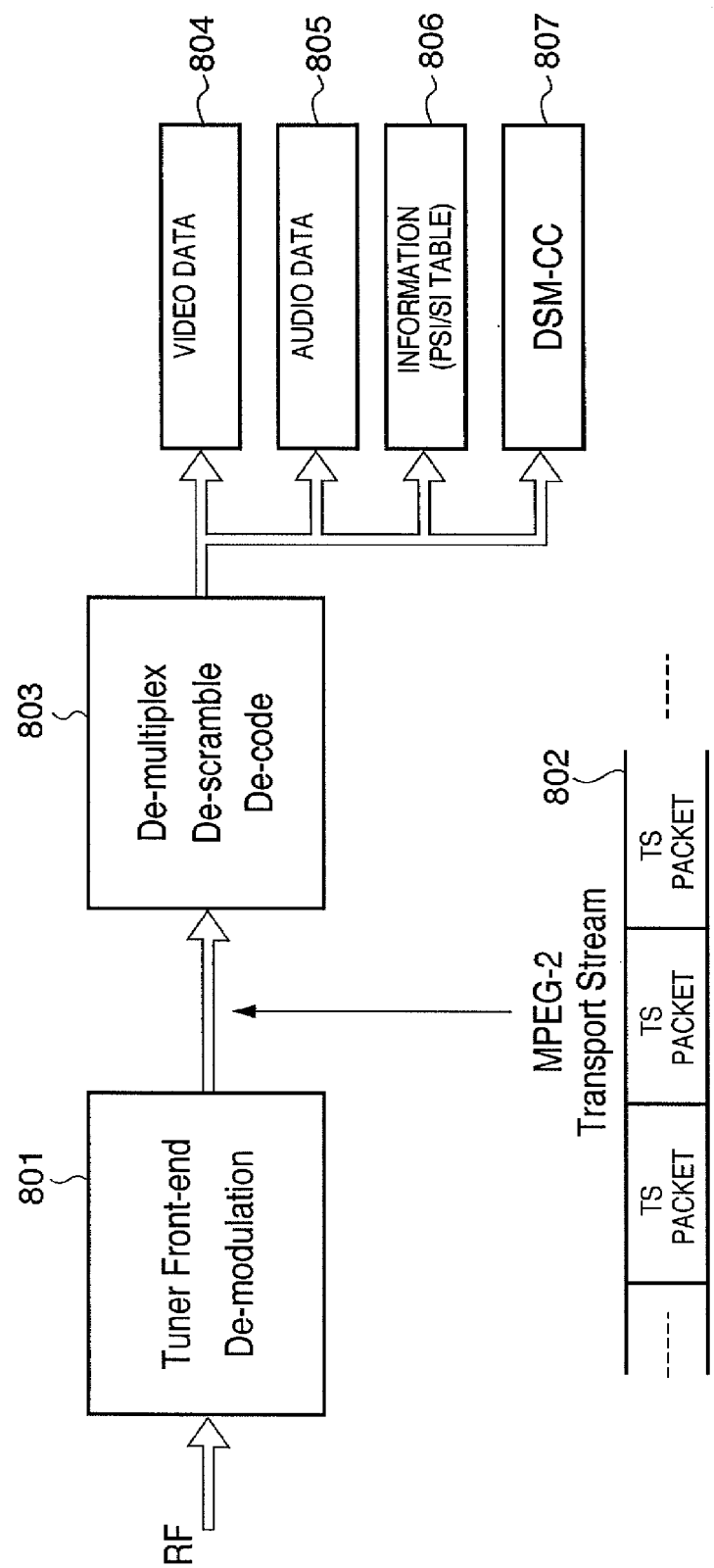
FIG. 8 is a chart for explaining the sequence of data processing in a digital broadcast reception controller in the digital television according to the embodiment of the present invention.

FIG. 8 is a chart showing the sequence of the data processing in the digital broadcast reception controller 704.

An external broadcast station compresses and encodes contents data such as video/image/audio data, and the like by MPEG-2, multiplexes the encoded data and other media, further makes PSK digital modulation of the multiplexed data in case of satellite broadcast, and then transmits the data from an antenna.

In this embodiment, a radio wave RF transmitted from the external broadcast station is received by the antenna 705, and is fetched into the digital broadcast reception controller 704.

The radio wave RF fetched by the antenna 705 is sent to a demodulator 801 to undergo de-modulation, thereby obtaining a multiplexed MPEG-2 TS (transport stream) 802.

A decoder (De-multiplex) 803 demultiplexes the TS 802, and de-scrambles the TS 802 by assigning a program number based on channel information selected by the user as needed. The TS 802 is demultiplexed into video data 804, audio data 805, information (PSI/SI table) 806, and DSM-CC 807, which are decoded as needed.

The transport stream (TS) 802 will be described in more detail below.

Figure 9:
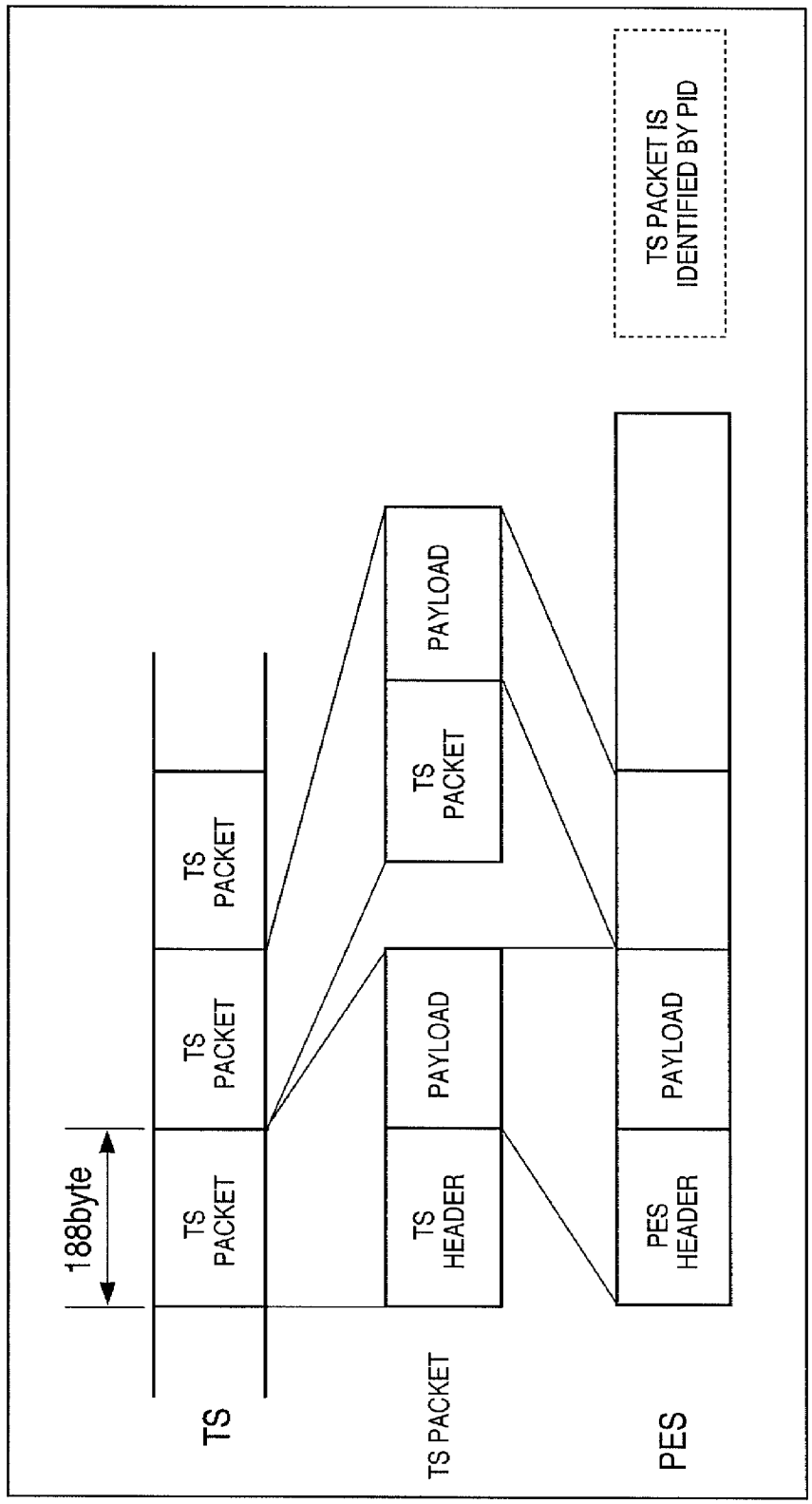
FIG. 9 is a view for explaining a transport stream TS according to the embodiment of the present invention.

FIG. 9 shows the configuration of a transport stream.

The TS 802 is configured by successive TS packets, each of which has a fixed TS packet length of 188 bytes.

Each TS packet is configured by a TS header and payload, and respective payloads are joined to configure a payload field of a PES (Packetized Elementary Stream).

A PES packet is configured by the above payload field and a PES header. PES payloads are coupled by determining based on PID information (to be described later) in TS packets if they form an identical content.

Since the PES is formed by dividing information which serves as a contents element such as MPEG video and audio data into blocks, and appending headers to the blocks, contents information of a broadcast program can be extracted from the PES.

Figure 10:
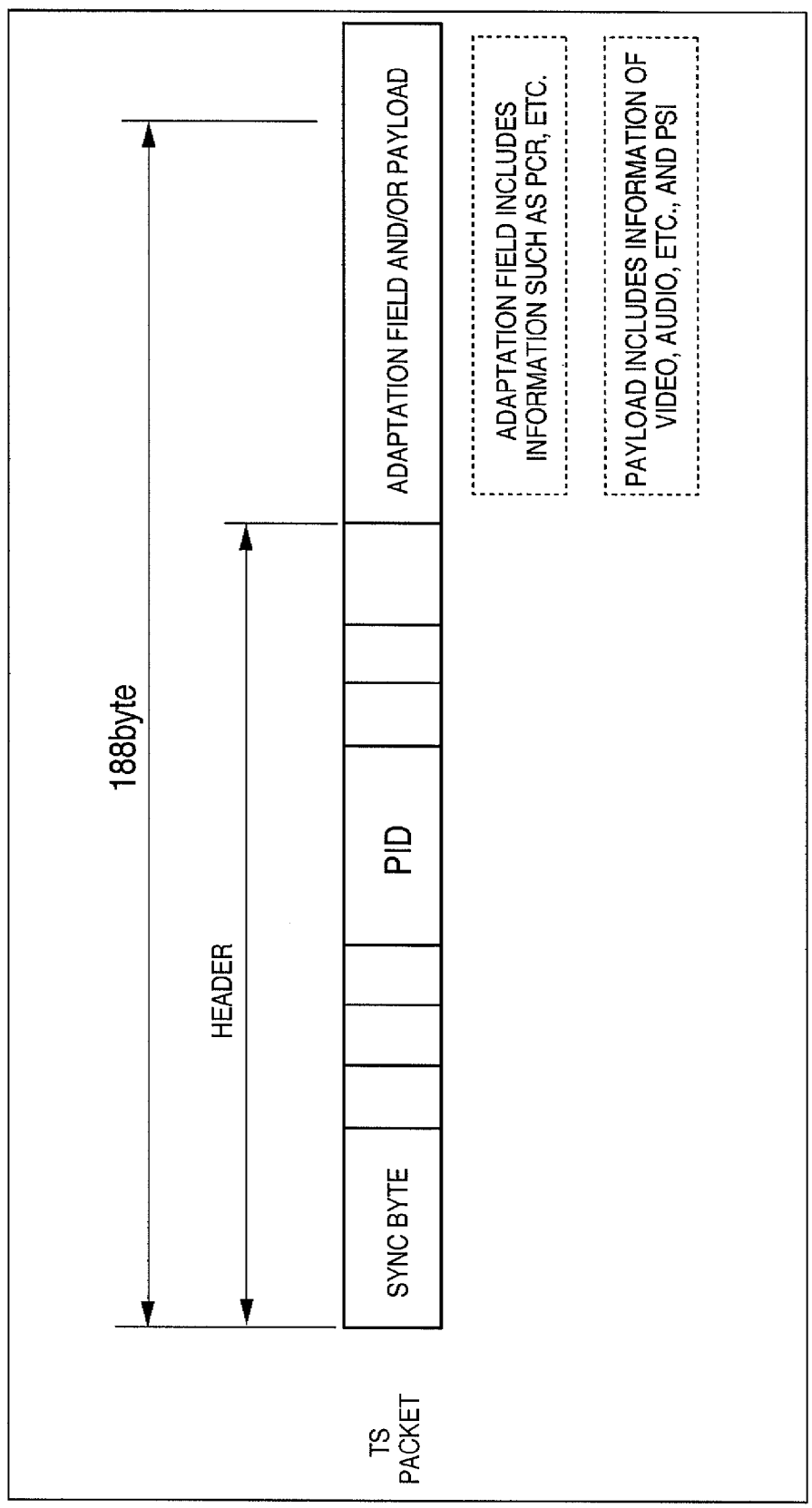
FIG. 10 is a view for explaining a transport stream packet according to the embodiment of the present invention.

FIG. 10 shows the configuration of a transport stream (TS) packet.

The TS packet is configured by 188 bytes by combining a 4-byte header and an adaptation field and/or payload. The header includes a sync byte, PID, and the like. The PID is an identification code, which has a role of identifying each TS packet.

The adaptation field includes information such as PCR and the like used in synchronization processing. The payload includes PSI/SI in addition to video and audio information and the like. The PSI is an abbreviation for Program Specific Information, and is sent as a table indicating program specification information.

Figure 11:
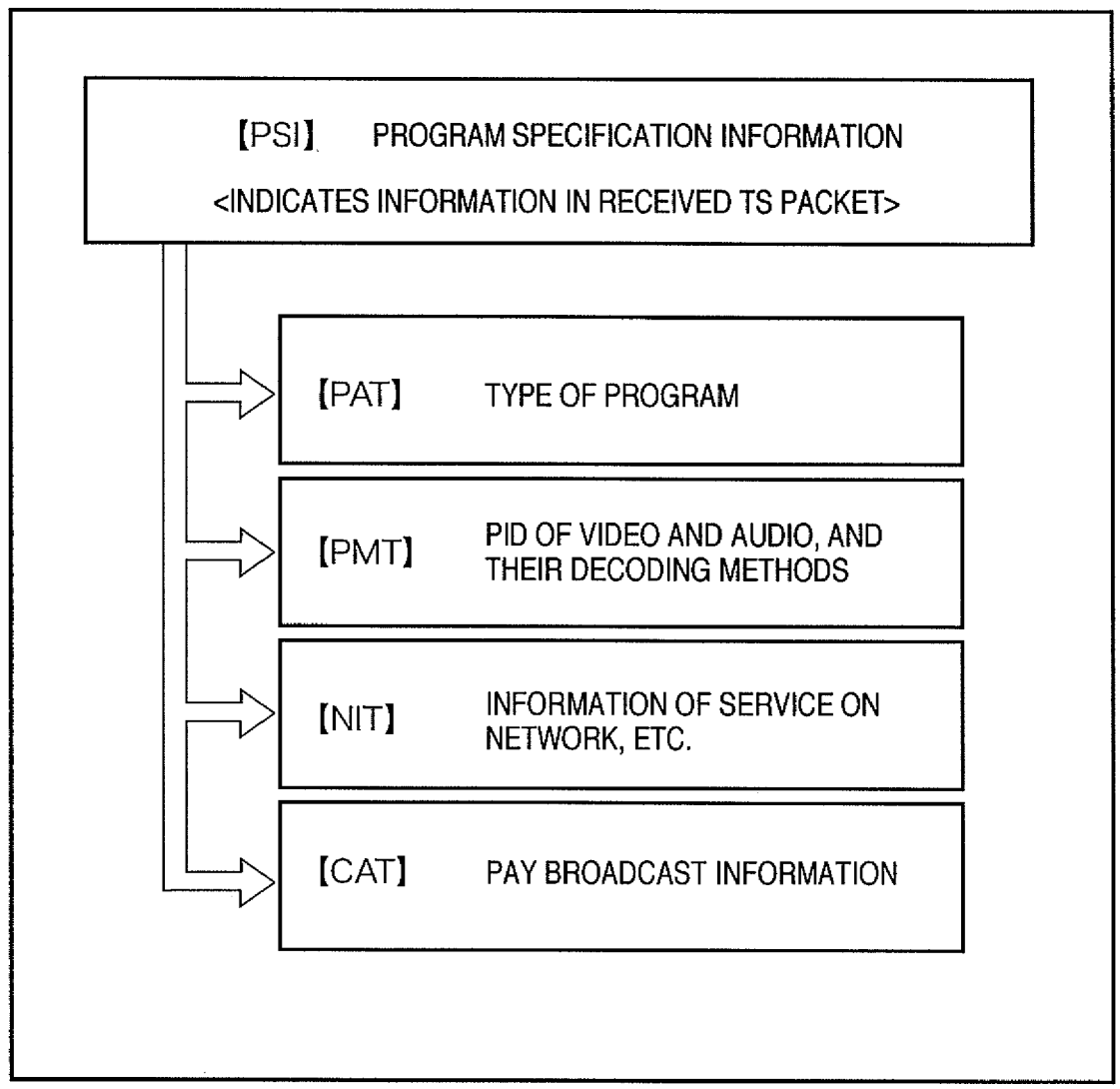
FIG. 11 is a view for explaining PSI according to the embodiment of the present invention.

FIG. 11 shows the configuration of the PSI.

The PSI is program specification information, which indicates information in the received TS packet. A PAT is an abbreviation for Program Association Table, which indicates the type of program. A PMT is an abbreviation for Program Map Table, which indicates the PID information of video and audio data and their decoding methods. An NIT is an abbreviation for Network Information Table, which indicates information of services and the like on the network. A CAT is an abbreviation for Conditional Access Table, which indicates pay broadcast information.

Program information according to a channel is extracted from data which is demultiplexed from the TS 802 by the decoder 803 based on these pieces of information, and is output to the display/acoustic unit 708 via the output processor 707.

Figure 12:
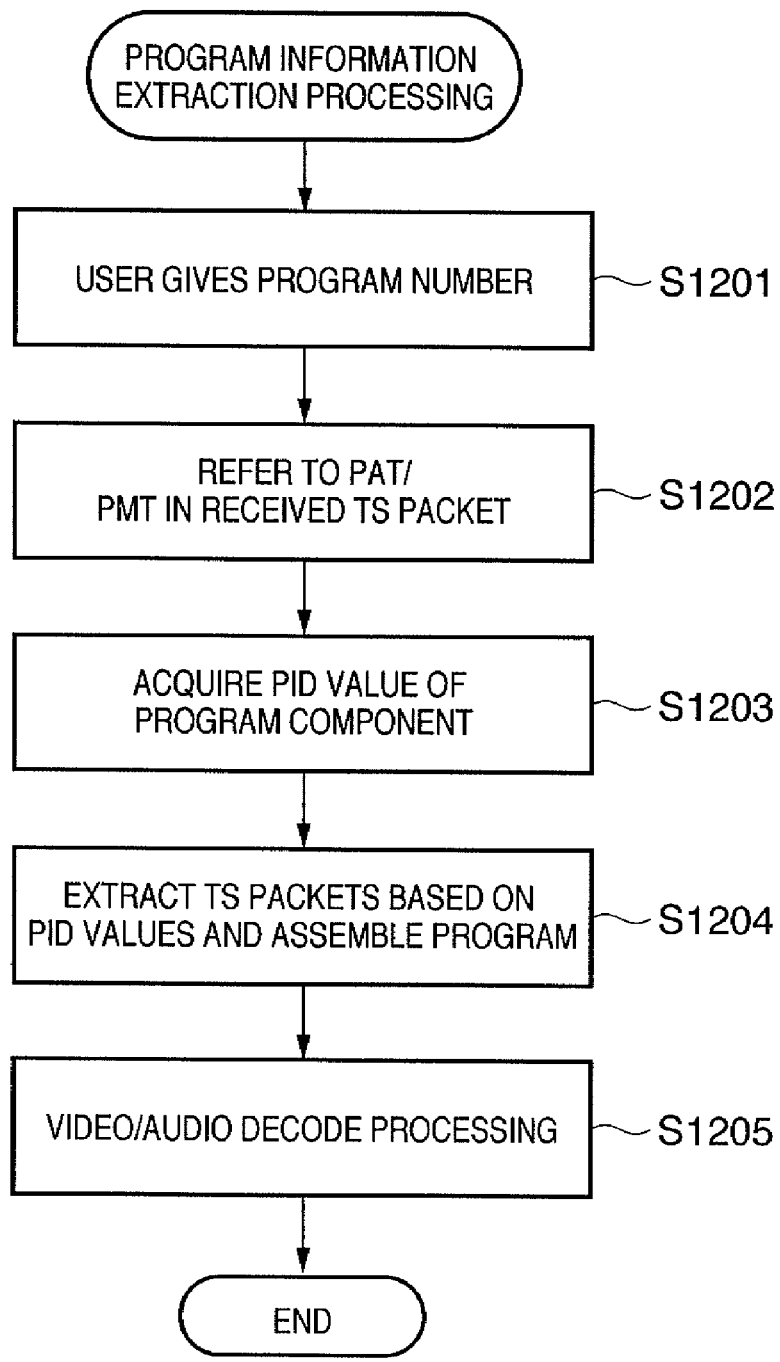
FIG. 12 is a flowchart showing the processing for explaining program information from TS packets according to the embodiment of the present invention.

FIG. 12 is a flowchart showing the program information extraction processing from TS packets.

Upon starting the program information extraction processing, a program number selected by a user's channel operation is given in S1201. PAT/PMT information is referred to from the PSI of each received TS packet in S1202, and the PID values of program components are acquired in S1203. TS packets are extracted based on the PID values to assemble a program in S1204, and video/audio decode processing of the extracted data is executed in S1205, thus ending the processing.

The generation sequence of video data upon extracting video data 804 from the TS packets will be described below.

Figure 13:
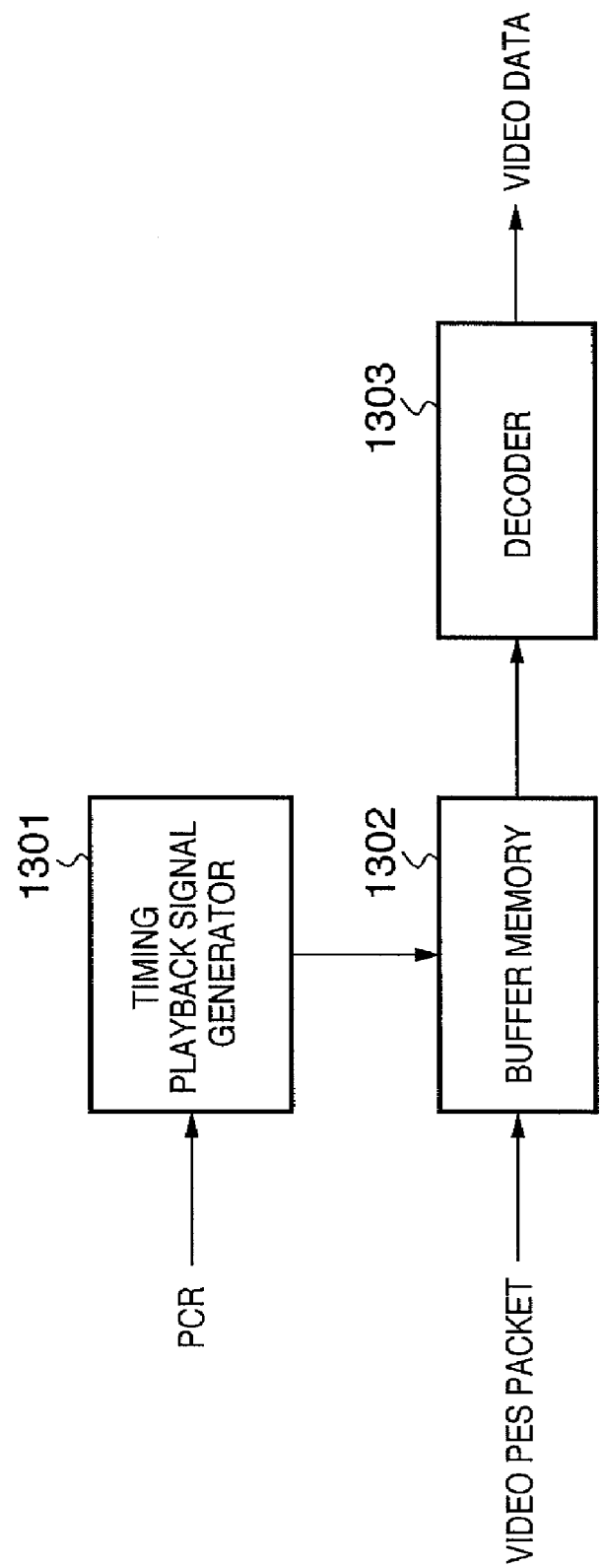
FIG. 13 is a diagram for explaining the processing for generating video data from a video packet (PES) according to the embodiment of the present invention.

FIG. 13 is a diagram for explaining the processing for generating video data from video packets (PES), that is, the processing for extracting video data 804 from TS packets in the decoder 803.

Referring to FIG. 13, reference numeral 1301 denotes a timing playback signal generator, which fetches PCR information in the adaptation field of each TS packet.

Reference numeral 1302 denotes a buffer memory which temporarily saves a video packet (PES) extracted from each TS packet.

The timing playback signal generator 1301 issues a signal to the buffer memory at a timing set by the PCR information, and data is sent to a decoder 1303 at that timing and is output as video data after decoding.

The print processing in this embodiment will be described below.

<<Print Control>>

This embodiment adopts the UPnP as a network environment software framework protocol which runs on the Ethernet™.

When the function of the UPnP is activated and starts processing as a control point (CP), the network printer 104 having the UPnP function stands by on the Ethernet™ 110.

After the UPnP function is activated, the network processor 710 in FIG. 7 issues a search request packet of an M-SEARCH method onto the Ethernet™ 110.

Upon reception of the request search packet, the network printer 104 returns a search response packet.

The response includes a service name and the like used in printing. Upon reception of this response, the DTV 101 recognizes and starts that service.

<<Print Service>>

There are roughly two print service methods in a home network environment without the intervention of any personal computer.

One method is a PUSH transfer typedirect print method in which the host side generates a print document and passes it to the printer.

The other method is a PULL transfer typeindirect print method in which the host side such as the DTV or the like passes a URI (Uniform Resource Identifier) as link information of a print document to the printer, and the printer acquires and prints print information at that URI.

This embodiment uses the PrintBasic service provided by the aforementioned UPnP.

<<PrintBasic Service>>

Features of respective print processes are as follows.

<PUSH Transfer TypeDirect Print Method>

1. The control print prepares a print document, and issues a JOB request.

2. The printer returns determined data sink information as a response.

3. The control point transfers the print document using "HTTP POST".

<PULL Transfer TypeIndirect Print Method>

1. The control point determines a print target URI as link information required to specify print data, and issues a JOB together with that URI.

2. The printer acquires a print target file using "HTTP POST" based on the received URI.

Figure 14:
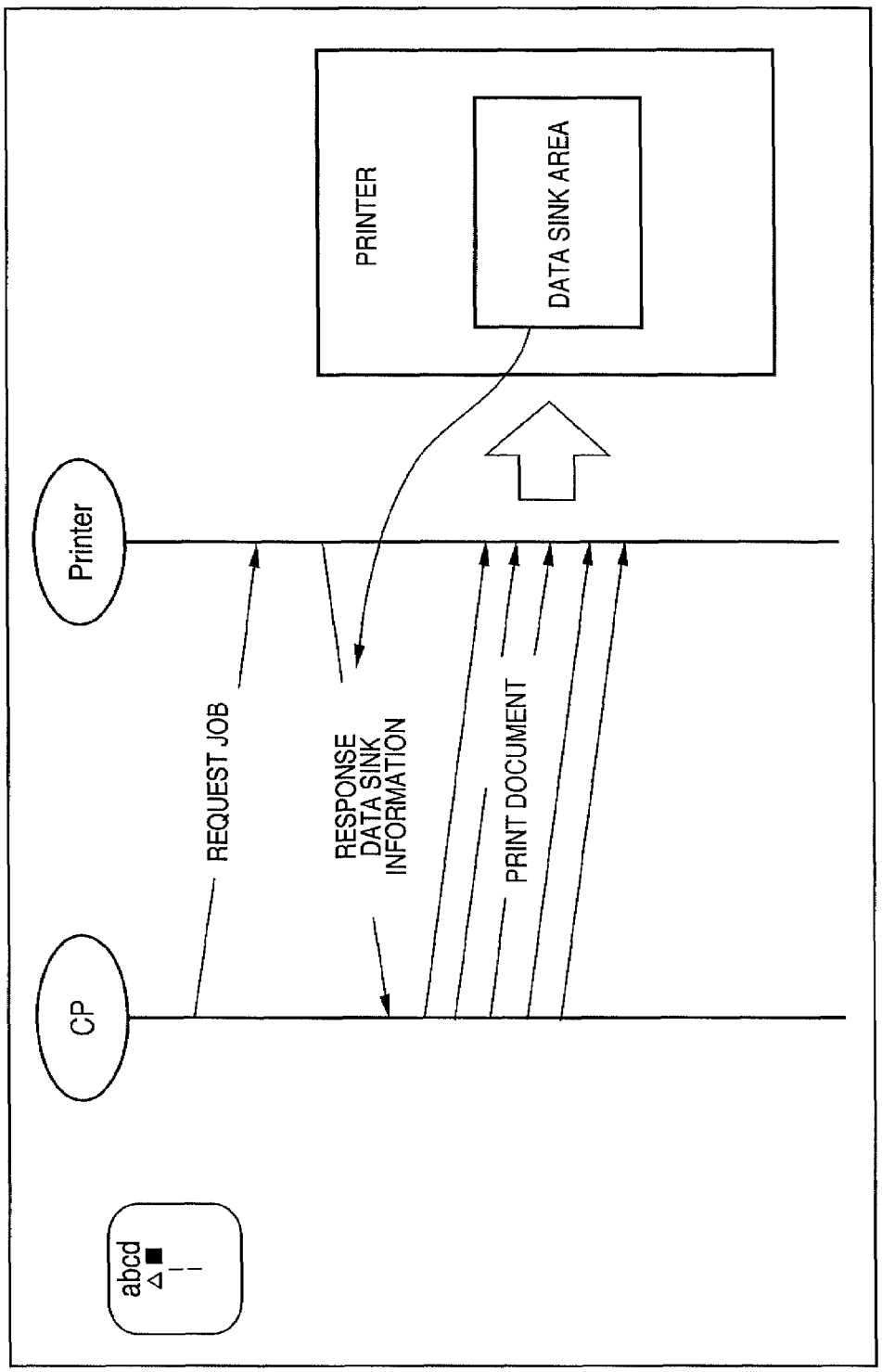
FIG. 14 is a chart for explaining a PUSH transfer typedirect print method.

FIG. 14 is a chart for explaining the PUSH transfer typedirect print method.

Referring to FIG. 14, the control point (CP) issues a request JOB to the printer after it prepares a print document.

If the printer can accept a print request, it sets a print data reception data sink area, and returns a response to the control point together with that information.

The control point starts data transfer of the print document using "HTTP POST" based on that information.

The printer receives the transfer data, and stores the data in the data sink area. The printer starts printing based on the data sink data.

Figure 15:
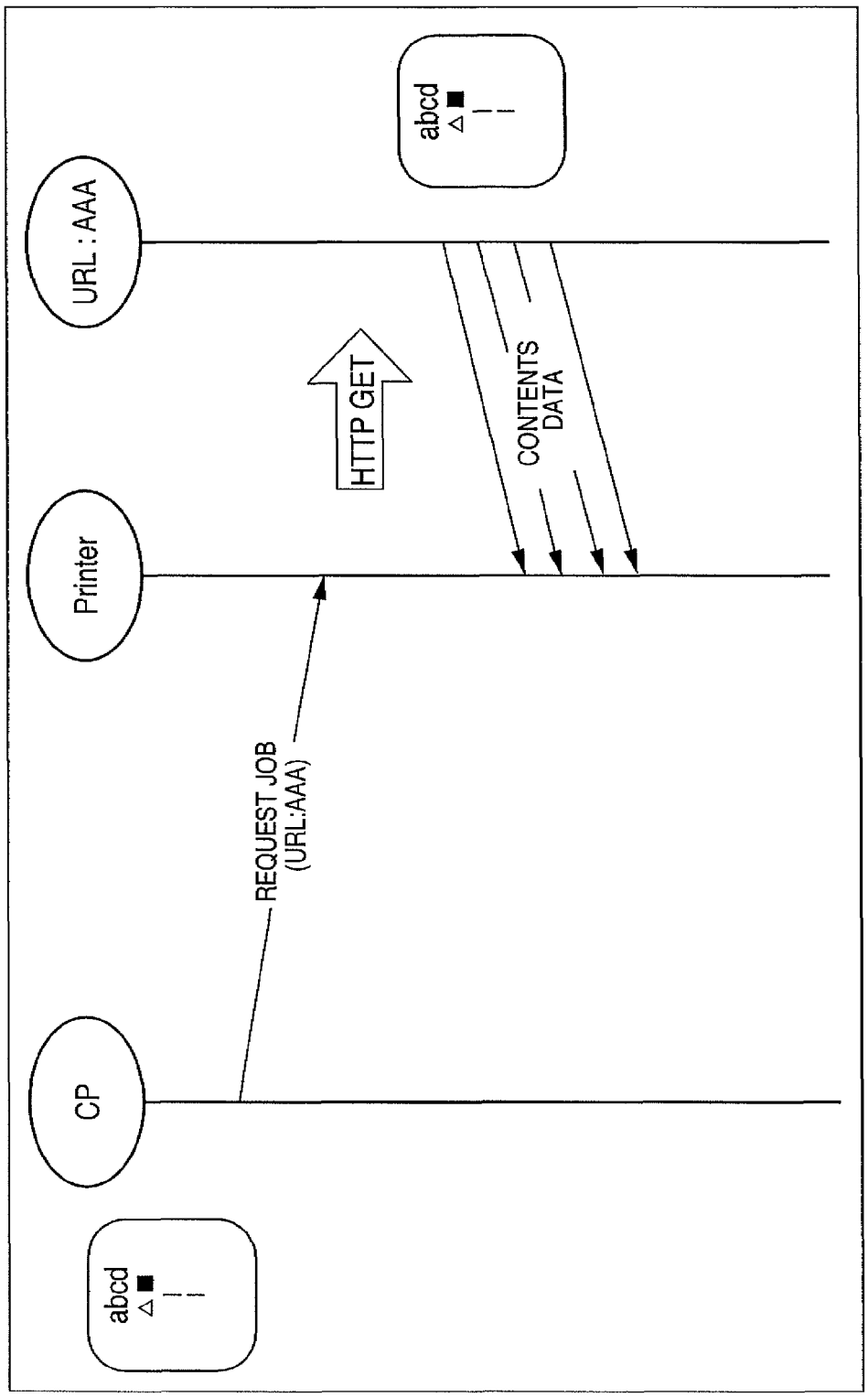
FIG. 15 is a chart for explaining a PULL transfer typeindirect print method.

FIG. 15 is a chart for explaining the PULL transfer typeindirect print method.

In FIG. 15, the control point (CP) determines a URI of a print document, and issues a request JOB together with that URI information.

The printer receives that JOB, and issues "HTTP GET" based on the URI information if it is ready to print, thus acquiring a print document at that URI.

The printer starts printing based on the acquired print document file.

Next, details of the processing until the printer starts printing in response to a request from the DTV will be described below.

In the direct print method, the DTV issues a print request JOB of the UPnP PrintBasic service together with information of the print condition.

The printer receives the JOB and interprets it as the JOB of the direct print method. If the printer can execute the JOB, it assures a buffer area of the data sink required to fetch a print document, and returns a response to the DTV together with the address information of the data sink.

The DTV issues a print document to that data sink using HTTP POST.

The printer starts modification processing of the received print document data in the data sink, and finally passes the data modified for printing to the printer engine, thus printing the document.

During this interval, the DTV allows other operations since data transfer is complete.

Also, the DTV periodically monitors the printer status as needed to confirm if the printout is completed.

With this print method, the DTV passes the print document to the printer in addition to the print request JOB. The data size of the print document is large, and the buffer load in the printer is considerably heavy. Hence, the printer cannot accept the next print JOB.

However, the direct print method has an advantage of a print processing time shorter than the indirect print method.

On the other hand, in the indirect print method, the DTV issues a print request JOB of the UPnP PrintBasic service to the printer together with the print target URI and information of the print condition, as described above.

The printer receives the JOB, and starts print processing if it is ready to execute that JOB.

The printer begins to fetch print document data from a WEB server designated by the URI via the network based on the received URI information.

The printer starts XHTML parsing in the data while fetching the data, then executes layout processing and rendering processing in turn, and finally passes data modified for printing to the printer engine, thus printing the document.

During this interval, the DTV allows other operations since data transfer is complete.

Also, the DTV periodically monitors the printer status as needed to confirm if the printout is completed.

In this print method, the data size of the print request JOB passed from the DTV to the printer is small, and the buffer load in the printer is low. Hence, the printer can accept the next print JOB. The next accepted JOB is queued, and is executed after completion of the previous JOB.

Figure 16A:
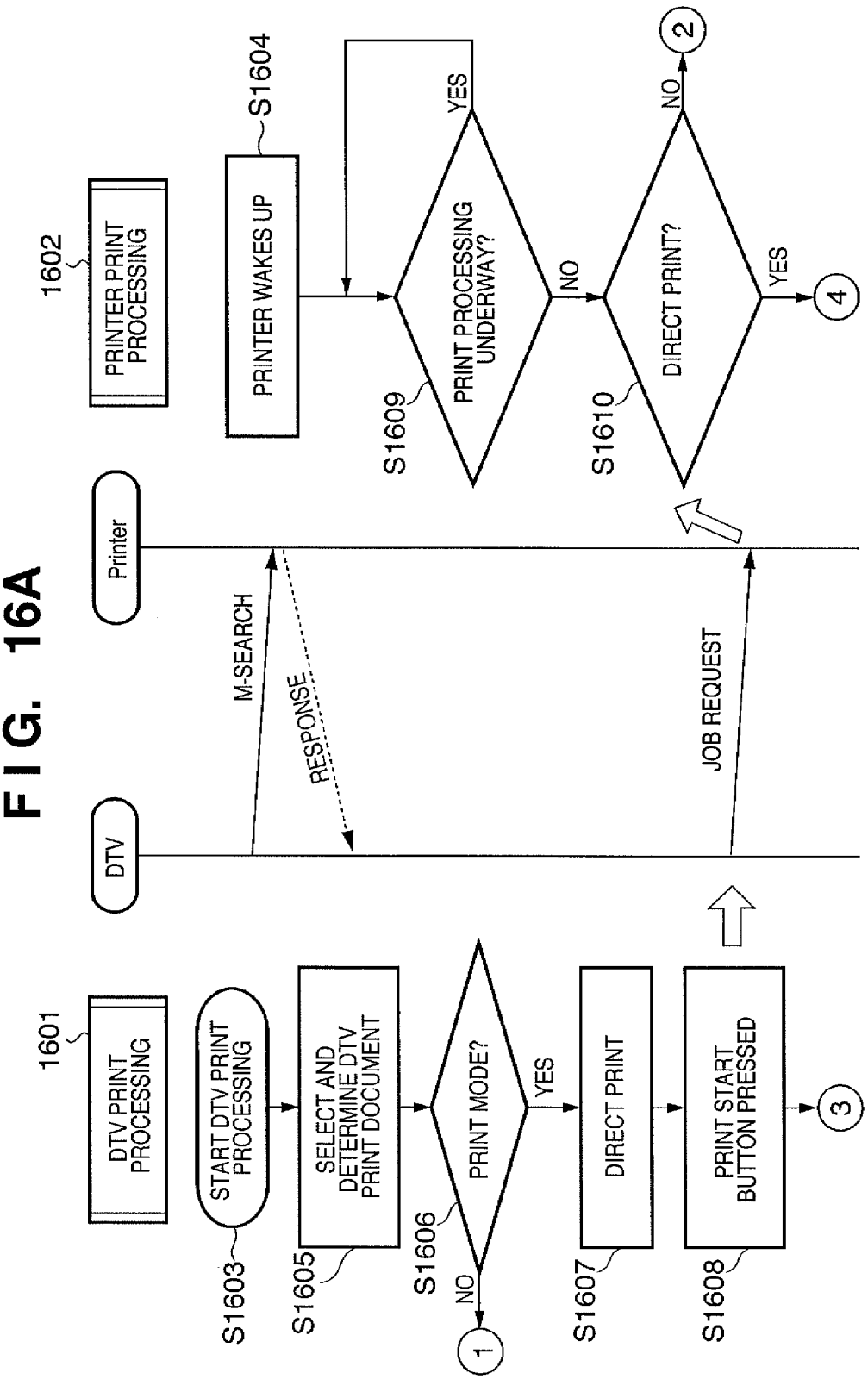
FIG. 16A is a flowchart showing the print processing of the direct print method according to the embodiment of the present invention.
Figure 16B:
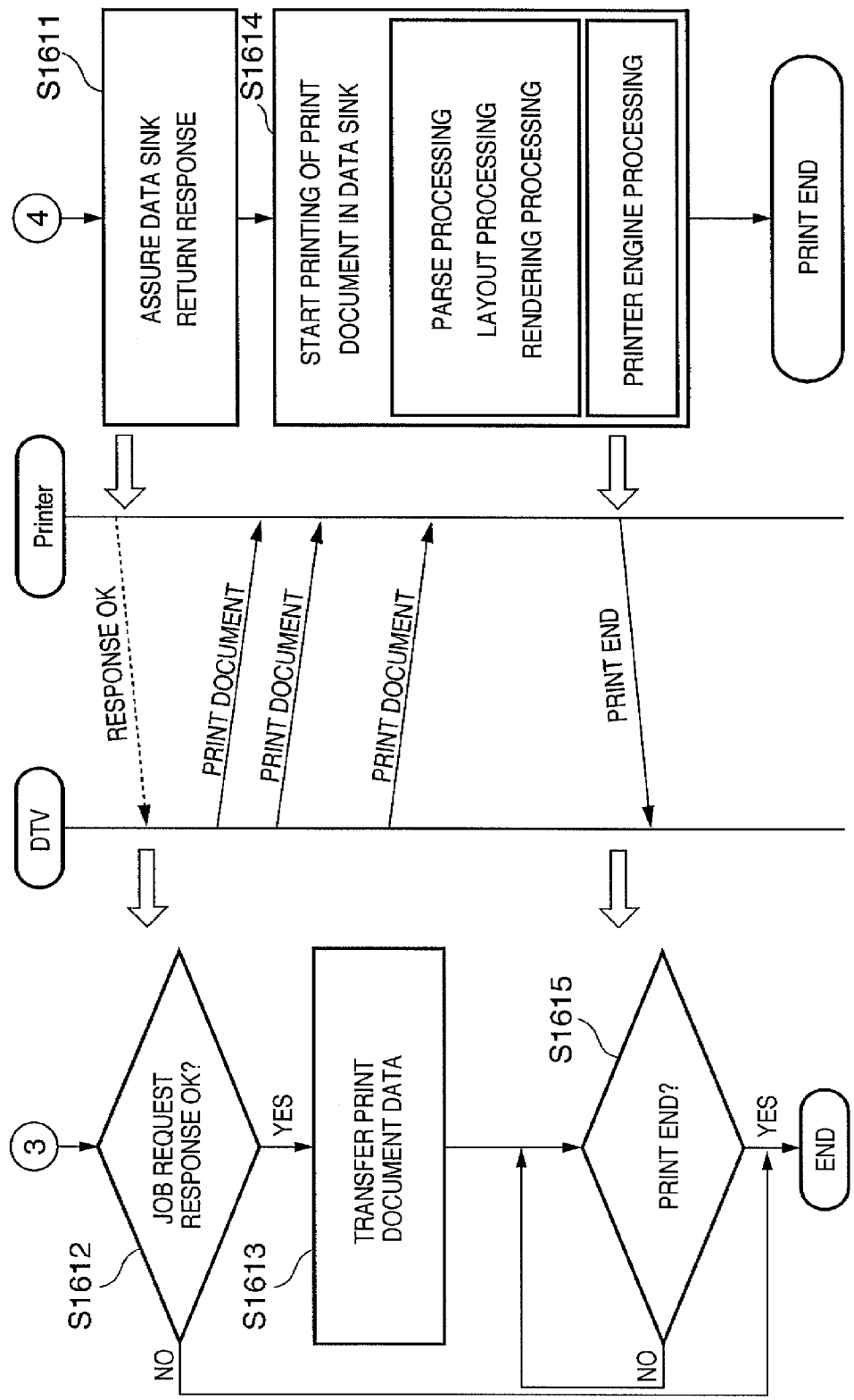
FIG. 16B is a flowchart showing the print processing of the direct print method according to the embodiment of the present invention.

FIGS. 16A and 16B are flowcharts showing the print processing by the direct print method.

In FIGS. 16A and 16B, the left side shows the processing on the DTV side, and the right side shows that on the printer side.

Reference numeral 1601 denotes a program module which executes print processing in the DTV; and 1602, a program module which executes print processing in the printer.

When the DTV starts print processing in S1603, it issues a UPnP "M-SEARCH" request to a printer on the network. If the printer receives that request, the printer main body in a power save mode wakes up, and returns a UPnP "response" including service (PrintBasic service) information and the like of the printer. Upon reception of the response, the DTV obtains the service information, and makes a print document selection operation in S1605 to determine a print document.

The DTV checks the print mode of the print document in S1606. If the print mode is the direct print method in S1607, the process advances to S1608; if the print mode is the indirect print method, the process advances to S1701 in FIG. 17A.

In S1608, a print start button used to print the determined print document is pressed.

The DTV issues a JOB request based on the aforementioned PrintBasic Service to the printer on the network. Upon reception of the JOB request, the printer checks in S1609 if the print processing is underway. If the print processing is not underway, the printer checks in S1610 if the print mode is the direct print method. If the print mode is the direct print method, the process advances to S1611 to assure a data sink and to return a response together with address information of the data sink.

The DTV checks in S1612 if the response to the JOB request is OK. The process then advances to S1613 to transfer print document data to the printer data sink.

The PrintBasic service issues HTTP POST to the printer on the network to transfer the print document.

The printer starts printing of the print document data sent to the data sink in S1614.

The print processing progresses to the parse processing, layout processing, and rendering processing in turn, and printing is executed by printer engine processing.

The DTV checks in S1615 if print is completed. Upon reception of print end information, the DTV ends the print processing.

Figure 17B:
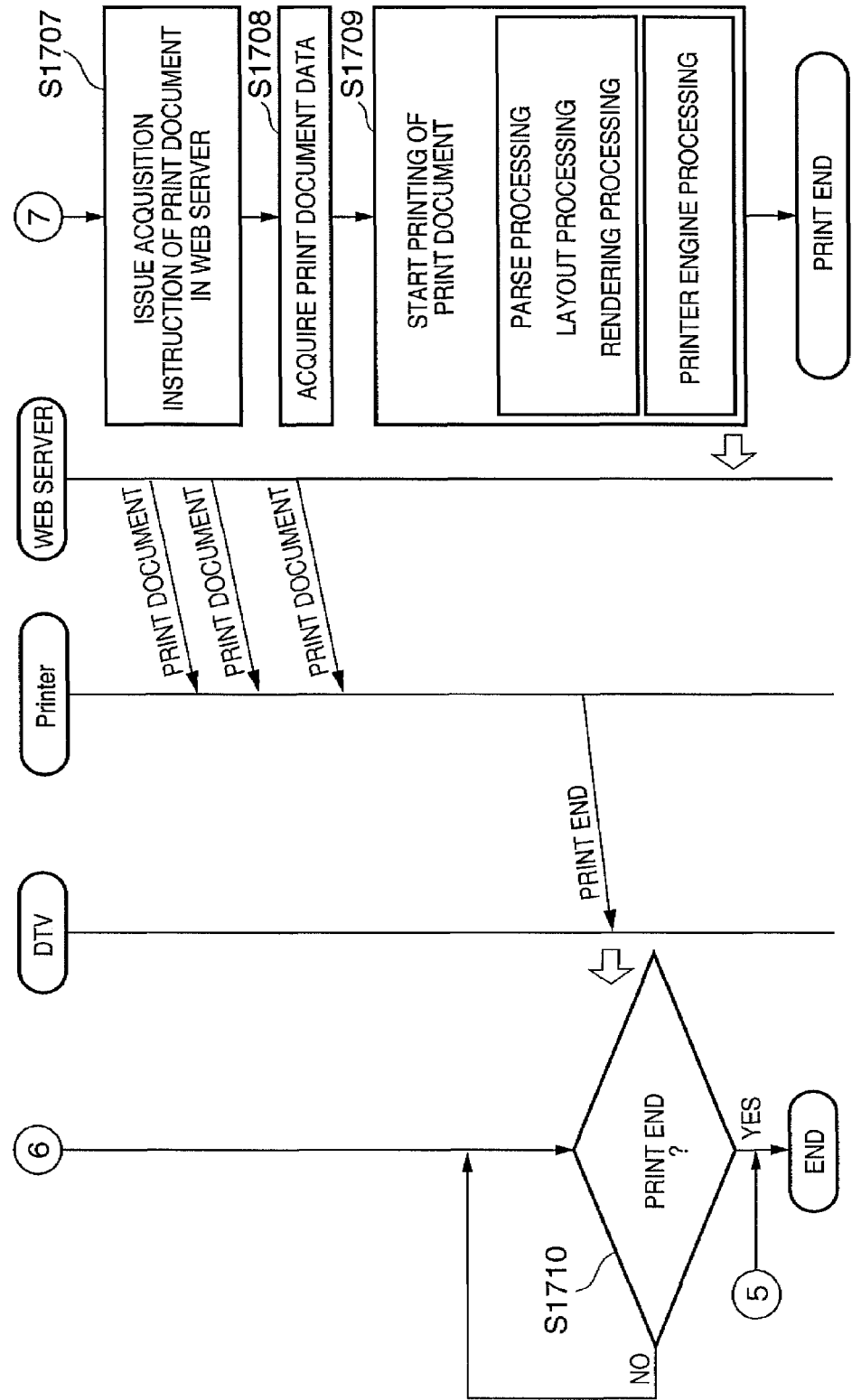
FIG. 17B is a flowchart showing the print processing of the indirect print method according to the embodiment of the present invention.

FIGS. 17A and 17B are flowcharts showing the print processing based on the indirect print method.

If the print document is to be printed based on the indirect print method, the process advances to S1701 in FIG. 17A.

In S1702, the print start button required to execute printing of the determined print document is pressed. The DTV issues a JOB request including print document URI information based on the PrintBasic service to the printer on the network.

Upon reception of the JOB request, the printer checks in S1703 if the print processing is underway. If the print processing is not underway, the printer checks in S1704 if the print mode is the indirect print method. If the print mode is the indirect print method, the process advances to S1705 to return a response indicating acceptance confirmation OK.

The DTV checks in S1706 if the response to the JOB request is OK, and waits for print processing in S1710.

Since the print mode is the indirect print method, the printer issues HTTP GET required to acquire a print document from a WEB server designated by the print document URI via the network in S1707.

The printer acquires the print document from the WEB server in S1708, and starts printing of that print document in S1709.

The print processing progresses to the parse processing, layout processing, and rendering processing in turn, and print is executed by printer engine processing.

The DTV waits for reception of print end information in above S1710. Upon reception of the print end information, the DTV ends the print processing.

Note that further advanced control is made in the print processing of the actual PrintBasic service.

In the PrintBasic service, a method of acquiring printer statuses and various functions associated with print are specified in addition to the aforementioned print processing, and a description thereof will not be given since details are described in the standardized specification.

Print processing services provided by the DTV will be exemplified below.

(1) Print contents mode (for example, Internet broadcasting, Internet print WEB contents)
(2) Screen copy mode (copy of a still image)
(3) Storage contents mode (print files)
(4) Capture mode (capture of a broadcast video picture)

(5) Capture mode (capture of moving image data of a DVD or the like)

This embodiment will explain examples adopting (1), (2), and (4) above.

(1) Print contents mode (for example, Internet broadcasting, Internet print WEB contents)

For example, print contents of the Internet broadcast are prepared in a specific WEB server on the Internet via the network.

In this case, the DTV uses the PULL transfer typeindirect print method.

Each print content is a document file which is described in an XHTML-based language, and includes many kinds of information such as image link destination information (URI) of a print file or text information and the like.

Even a content which is not a print specific content can be printed. In particular, the print content is suited to print by reducing the print load while setting a size limitation.

This embodiment executes print processing of a print content in the Internet broadcast.

Upon selection of the Internet broadcast, the DTV displays a selected broadcast WEB content.

When the broadcast WEB content displayed on the screen includes a print content, a "print" button is displayed, as shown in FIG. 19. When the user selects and presses the print button using the remote controller 1801 shown in FIG. 18, the print processing starts.

The aforementioned local contents module incorporates URI information of the link destination of the print content. When the user presses the print button after image selection, the print URI information of the selected image is extracted, and the URI information and the like are sent to the printer, thus printing the selected image.

The DTV executes print JOB issuance processing based on the PULL transfer typeindirect print method of the UPnP PrintBasic service. After the URI of a print target and print conditions are determined (a description thereof will not be given), the DTV issues a print request JOB to the printer together with information of the URI and print conditions.

The printer interprets the contents of the request JOB, acquires information at the URI using "HTTP GET", and executes print processing.

(2) Screen copy mode (copy of a still image)

In this mode, when a still image is displayed on the screen, its hard copy is printed.

Each content of the data broadcast or each Internet broadcast WEB content displays a still image on the screen. If such content is a print content, it can be printed intact by the PULL transfer typeindirect print method. However, if the content is not a print content, since the indirect print method cannot be used, a hard copy of the display screen contents need be printed.

In this case, the DTV uses the PUSH type direct print method.

This embodiment prints a hard copy of each contents information of the data broadcast.

In the data broadcast, a local contents module with the identical contents called Data Carsel transmission is repetitively transmitted.

The local contents module is fetched as a data sequence for one period of the aforementioned DSM-CC 807 and is temporarily saved. FIG. 8 shows a state in which the DSM-CC 807 is demultiplexed from the TS 802.

After the fetched local contents module is interpreted, a plurality of files are obtained and are saved again. These files are reconstructed and displayed.

By a selection operation using a capture button 1803 of the remote controller 1801, the screen that displays a data broadcast content at the time of operation can be captured as a still image. After that, the captured still image is designated as a print target by pressing a print button 1804. The still image fetched from a file used for display upon selection is reconstructed as print data in the DTV, and is passed to the print processor.

The local contents module of this embodiment is described using BML. By parsing the local contents module, the local contents module is separately managed as the types of data such as (i) still image "jpeg", (ii) graphic "png", (iii) character "text", and (iv) control code "text".

Note that the content in this case does not include any moving image.

FIG. 20 shows an example of the screen of the data broadcast.

In FIG. 20, a JPEG still image is laid out at the upper left position of the screen, character text is laid out at the upper right position, and a PNG graphic is laid out at the lower left position. In FIG. 20, the content does not include any moving image content, as described above. However, if the content includes a moving image, the moving image is laid out and displayed at the lower right position.

Upon pressing the capture button 1803 of the remote controller 1801 in this state, a hard copy of the display screen is practiced. Then, upon pressing the print button 1804, the print processing starts.

When the hard copy is practiced, the DTV edits display image data saved for data broadcast playback as that for printing to form a print document.

The DTV executes the print JOB issuance processing based on the PUSH transfer type direct print method. After a print target and print conditions are determined (a description thereof will not be given), the DTV issues a print request JOB to the printer together with information of the print conditions.

The printer interprets the contents of the request JOB and returns data sink information for accepting print data to the DTV as a response.

Upon reception of the response, the DTV transfers the print data to the data sink using "HTTP POST". The printer starts the print processing of the print data in the data sink.

(4) Capture mode (capture of a broadcast video picture)

In this mode, when a moving image is displayed on the screen, an image obtained by capturing the screen is printed. The moving image includes a video picture of the digital broadcast, that played back from an external storage device and DVD/video player, that of the Internet broadcast, and the like. Upon printing such moving image, capture processing for temporarily capturing a still image is required.

In this case, the DTV uses the PUSH transfer type direct print method.

This embodiment prints a still image captured by the capture processing of the digital broadcast. Digital broadcast contents include those which are copy/capture-protected due to the copyrights and the like. In this embodiment, a description will be made under the assumption that the content to be captured is a capture-free content.

<Capture of Digital Broadcast>

FIG. 8 above shows a state in which the video data, audio data, and PSI are demultiplexed from the TS 802.

In the digital broadcast, upon selection of a program, video data, audio data, and the like of the program of interest are selected based on the PSI and are decoded to display data, which is displayed on the screen.

Figure 21:
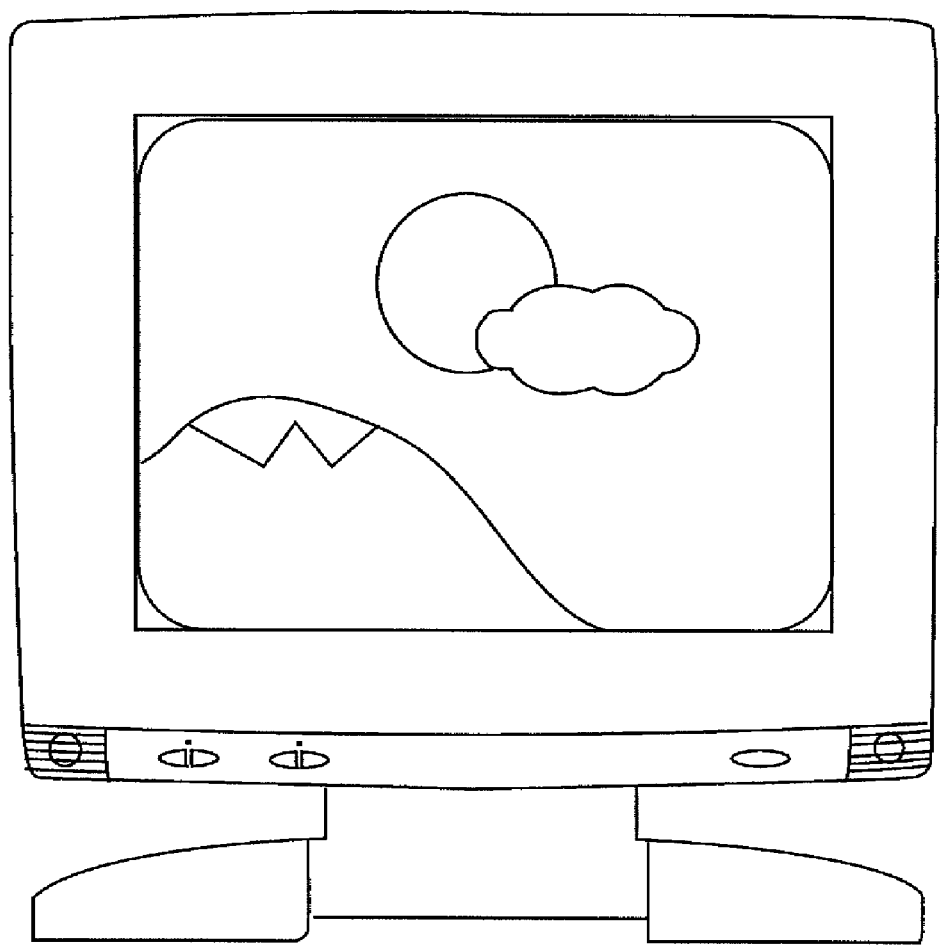
FIG. 21 is a view exemplifying a display screen of a moving image of digital broadcasting according to the embodiment of the present invention.

FIG. 21 shows an example of the screen of the digital broadcast.

In the print processing of a capture image, a video picture which is being displayed at the time of pressing of the capture button 1803 of the remote controller 1801 is captured, and is displayed as a still image.

In this state, when the user presses the print button 1804 of the remote controller 1801, the print processing of the capture image starts.

In the capture processing, normally, a moving image is displayed on the screen while video data is rasterized and rewritten all the time on a video RAM. However, upon execution of the capture processing, the DTV reads out temporarily saved data to form a file, and saves that file as a still image. Furthermore, the DTV edits the saved still image as that for printing to form a print document, and saves the print document.

When the print processing starts, the DTV executes the print JOB issuance processing using the PUSH transfer type direct print method of the UPnP PrintBasic service.

After a print target and print conditions are determined, the DTV issues a print request JOB to the printer together with information of the print conditions.

The printer interprets the contents of the request JOB, and returns data sink information for accepting print data to the DTV as a response.

Upon reception of the response, the DTV transfers the print data to the data sink using "HTTP POST". The printer starts the print processing of the print data in the data sink.

<<Print Data Saving Processing>>

This embodiment has a function of storing print data, allowing the user to select required data, and printing the selected data all together.

In this print processing, the function of the capture button 1803 of the remote controller 1801 used in the capture processing in the description of "(4) Capture mode" is changed. The function after change allows the capture button 1803 to serve as a print data save button to save the display screen as print data for 10 seconds after the latest operation of a program button 1802 or the like of the remote controller 1801.

For example, when the user switches a channel by pressing a given program button 1802 of the remote controller to change a program, the print data saving processing is executed for 10 seconds after that operation in place of the capture processing upon pressing of the capture button 1803.

The print data saving processing will be described below with reference to FIG. 22.

Figure 22:
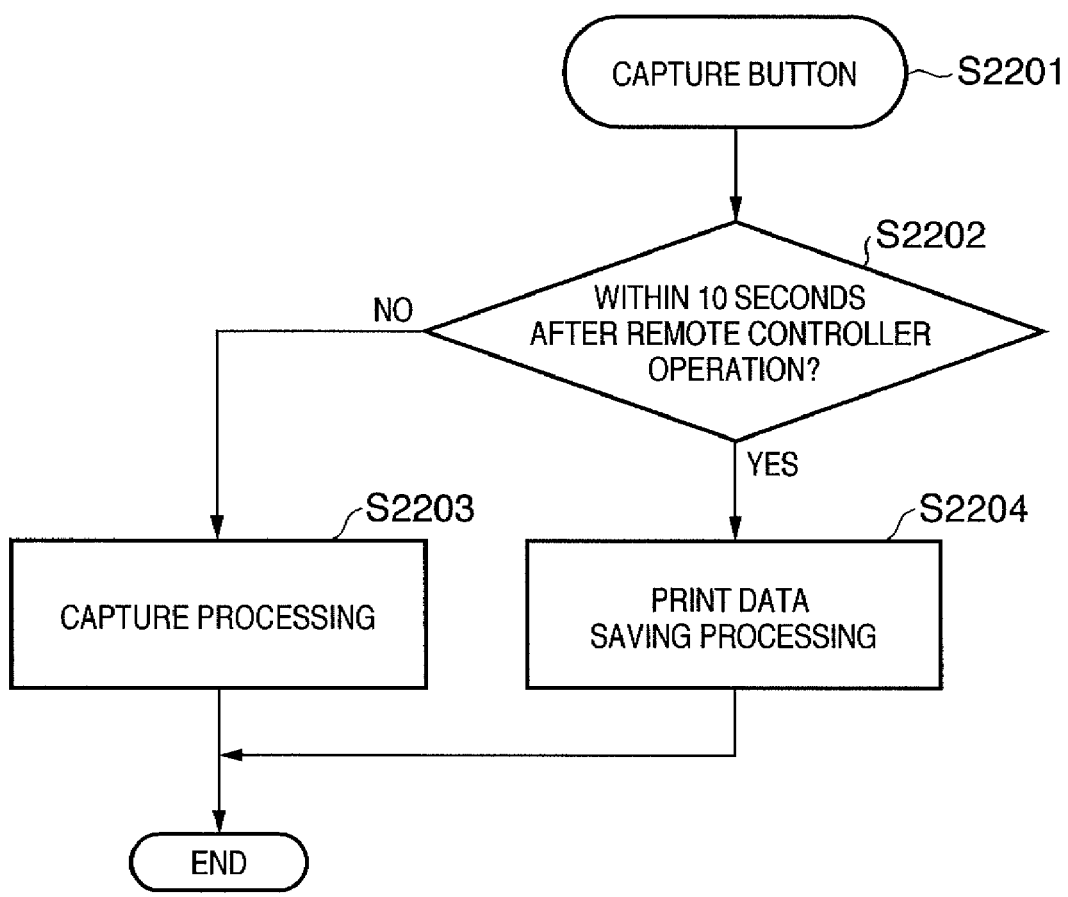
FIG. 22 is a flowchart showing the processing for changing the function of a capture button of the remote controller according to the embodiment of the present invention.

Referring to FIG. 22, if the user presses the capture button 1803 in S2201, it is checked in S2202 if 10 seconds have elapsed after the latest operation of the remote controller 1801. If 10 seconds have elapsed, the process advances to S2203; otherwise, the process advances to S2204.

In S2203, the capture processing starts.

In S2204, the print data saving processing starts.

Note that the button used for the print data saving processing is not limited to the capture button. For example, a dedicated button or the like may be set on the remote controller 1801.

The print data saving processing will be described in more detail below.

The print data saving processing of the print contents mode (Internet broadcast) will be described first.

The Internet broadcast is selected using the remote controller 1801, and if an image at that time is selected as a print content, the print button shown in FIG. 19 is displayed on the screen. Upon pressing of this print button, normal print processing is executed. If the capture button 1803 of the remote controller is operated within 10 seconds in this state, it serves as a button for the print data saving processing. Hence, upon pressing of the capture button 1803, the print data saving processing starts.

When the print data saving processing starts, the DTV checks the contents of the display screen. If the contents of the display screen are a print content, the DTV extracts a link destination URI as information to be sent to the printer in the PULL transfer type indirect print method, and manages and saves the URI as an attribute of the PULL transfer type indirect print method.

The DTV executes the screen capture processing to leave display data corresponding to the print content data. The DTV saves data as a pair of information in association with each other.

Since this display data is used for index display to be described later, it may be saved to have a size after reduction processing.

If, for example, a hard disk or the like is connected to the DTV as an external storage device, it may save files managed by the DTV.

The print data saving processing upon selection of "(2) Screen copy mode (copy of a still image)" by operating the remote controller will be described below.

The user selects the data broadcast using the remote controller 1801 to display a still image for the data broadcast. As in the above description, since the function of the capture button 1803 of the remote controller serves as a button for saving print data if it is operated within 10 seconds in this state, the print data saving processing starts upon pressing of this capture button 1803.

When the print data saving processing starts, the DTV checks the contents of the display screen. If the contents of the display screen are a still image for the data broadcast, the user presses the capture button 1803 of the remote controller to form a hard copy of the display screen.

As in the above description, a local contents module of the data broadcast still screen is described using BML. By parsing the local contents module, the local contents module is separately managed as types such as (i) still image "jpeg", (ii) graphic "png", (iii) character "text", and (iv) control code "text".

Assume that the content in this case does not include any moving image.

Upon starting the hard copy, the DTV edits a copy file saved for display as that for printing to form a print document, and manages and saves it as an attribute of the PUSH transfer type direct print method in association with the display data.

As in the above description, since this display data is used for index display to be described later, it may be saved to have a size after reduction processing.

Likewise, if, for example, a hard disk or the like is connected to the DTV as an external storage device, the hard disk may save files managed by the DTV.

The print data saving processing upon selection of "(4) Capture mode (capture of a broadcast video picture)" by operating the remote controller will be described below.

When the user selects the digital broadcast using the remote controller 1801, a video picture of the digital broadcast is displayed on the screen.

As in the above description, since the function of the capture button 1803 of the remote controller serves as a button for saving print data if it is operated within 10 seconds in this state, the print data saving processing starts upon pressing of this capture button 1803.

When the print data saving processing starts, the DTV checks the contents of the display screen. If the contents of the display screen are a video screen of the digital broadcast, the DTV captures a video picture which is being displayed at the time of pressing of the capture button 1803 of the remote controller 1801 and saves it as a still image.

In the capture processing, normally, a moving image is displayed on the screen while video data is rasterized and rewritten all the time on a video RAM. However, upon execution of the capture processing, the DTV forms a file of capture data and temporarily saves that file. Furthermore, the DTV edits the capture file data as that for printing to form a print document, and manages and saves it as an attribute of the PUSH type direct print method in association with the display data.

As in the above description, since this display data is used for index display to be described later, it may be saved to have a size after reduction processing.

Likewise, if, for example, a hard disk or the like is connected to the DTV as an external storage device, it may save files managed by the DTV.

Figure 23A:
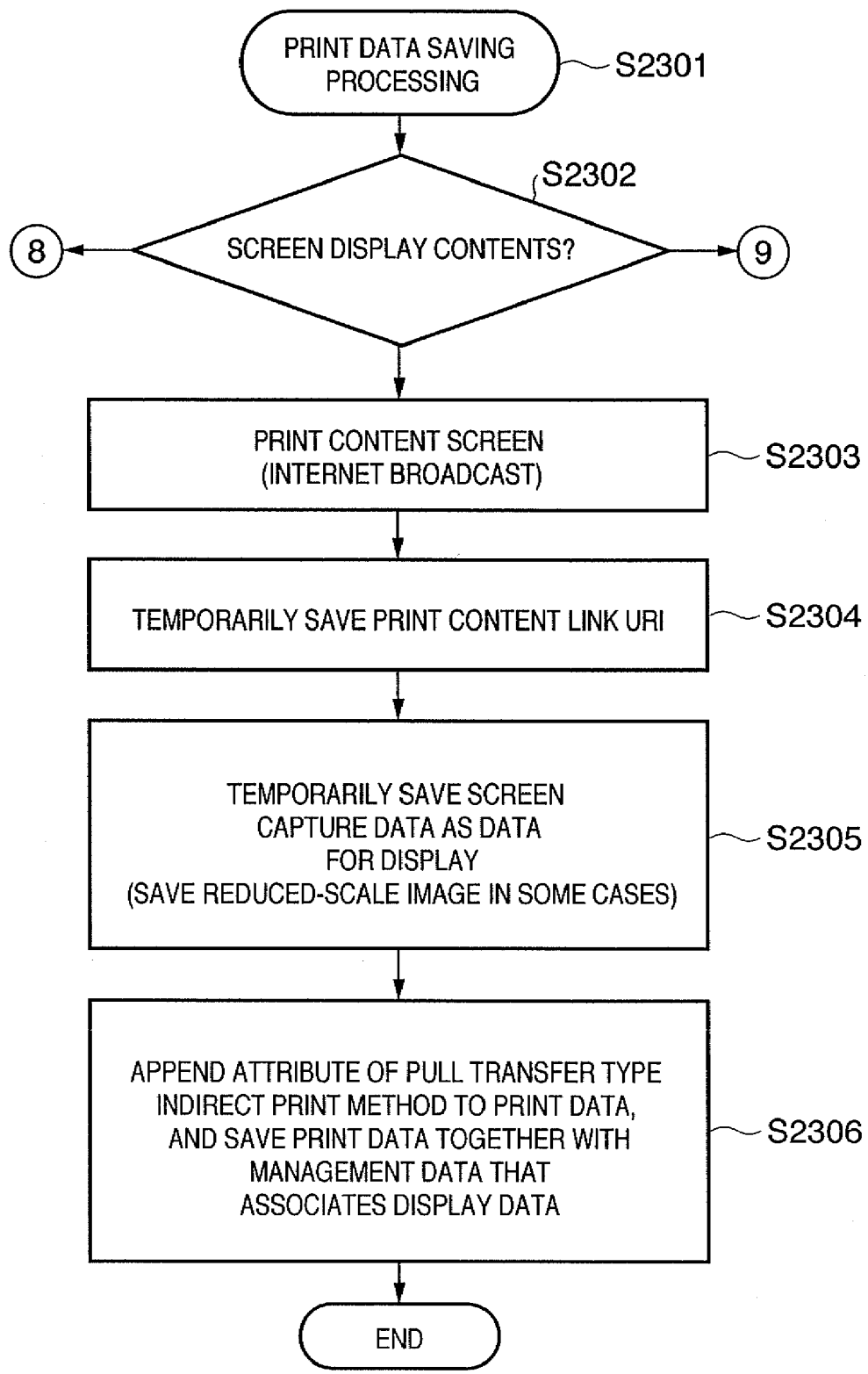
FIG. 23A is a flowchart showing print data saving processing according to the embodiment of the present invention.
Figure 23B:
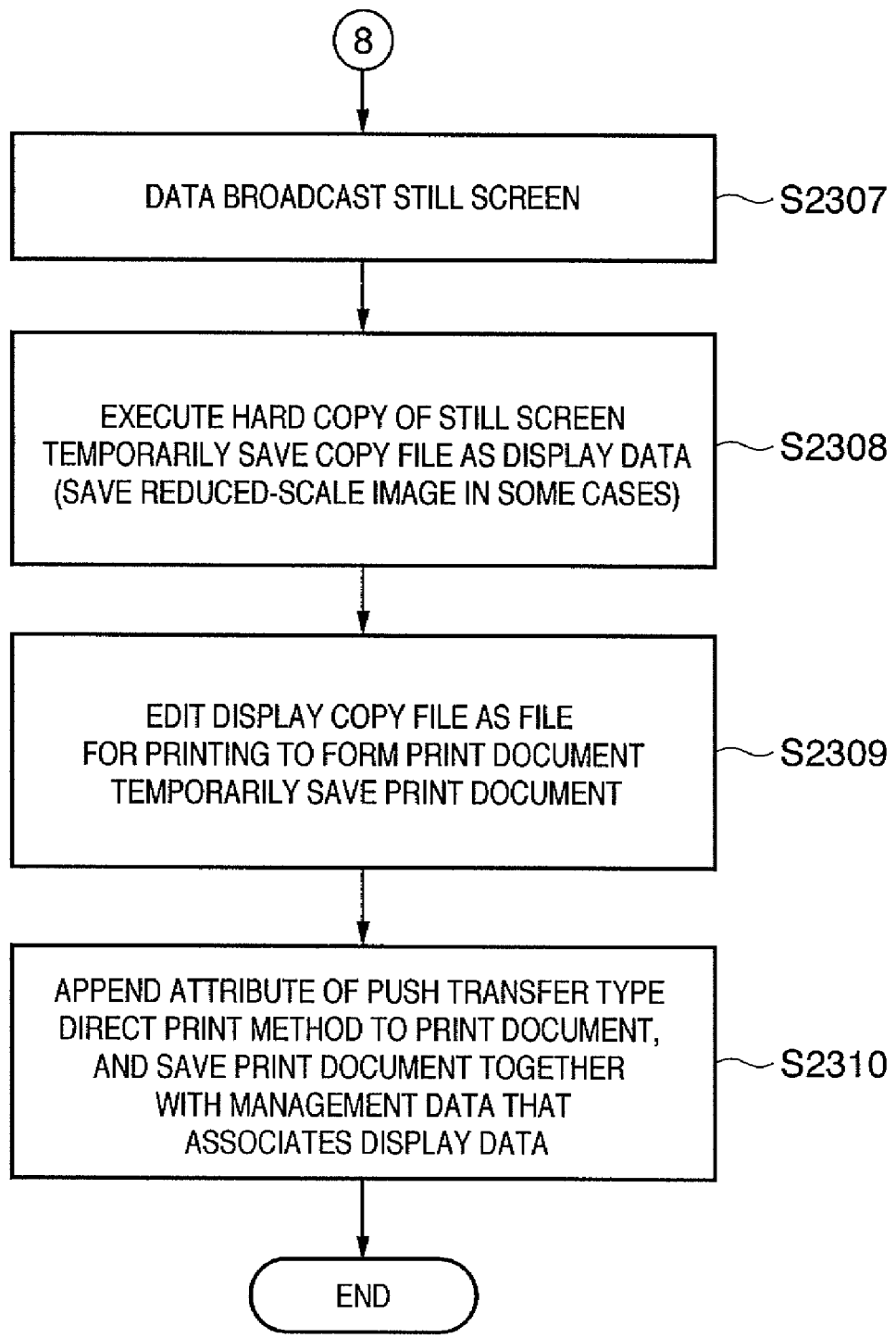
FIG. 23B is a flowchart showing print data saving processing according to the embodiment of the present invention.
Figure 23C:
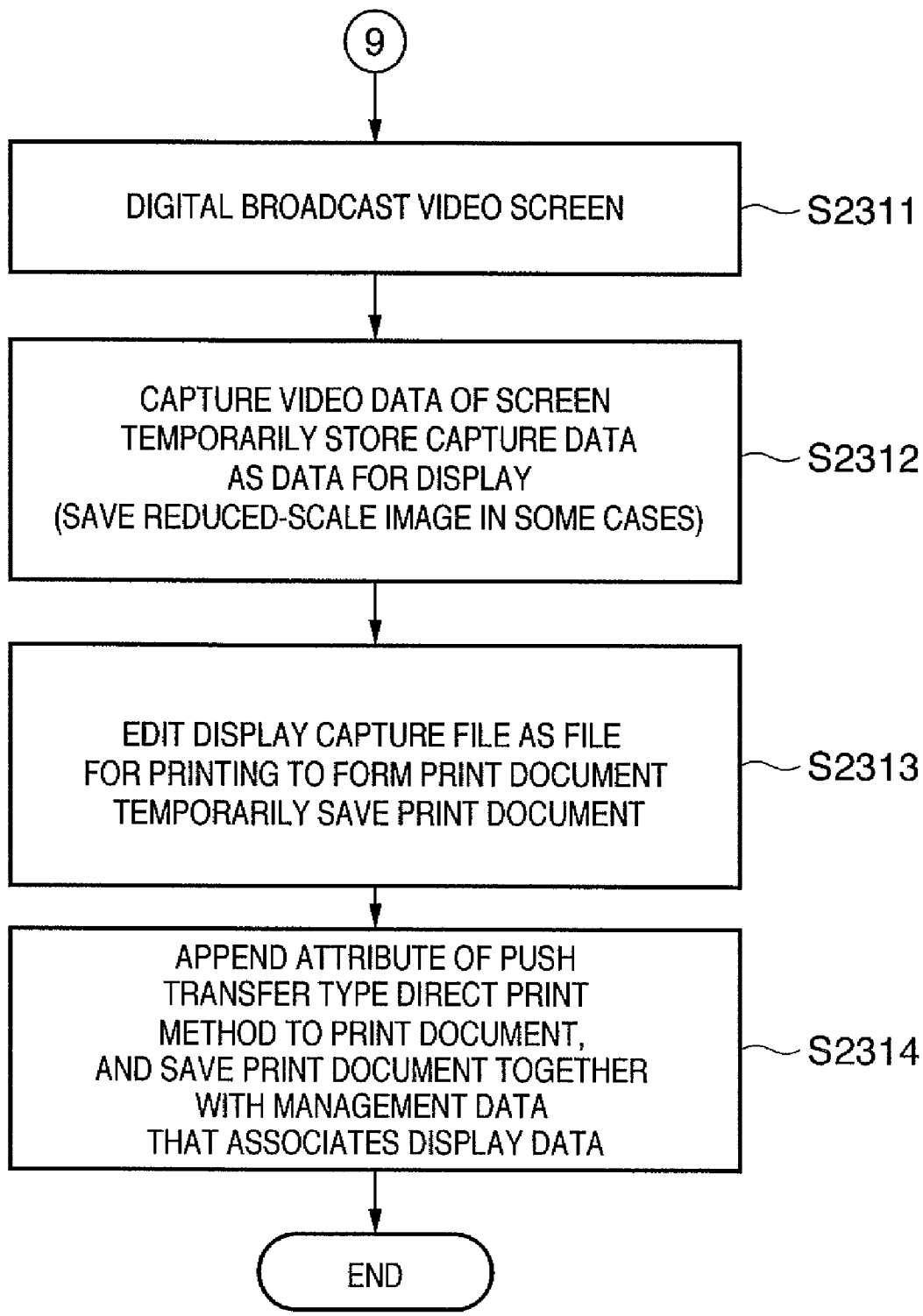
FIG. 23C is a flowchart showing print data saving processing according to the embodiment of the present invention.

FIGS. 23A to 23C are flowcharts of the print data saving processing.

When the user presses the capture button within 10 seconds after the latest previous operation of the remote controller 1801, the print data saving processing starts in S2301.

In S2302, the DTV checks the screen display contents. If the screen display contents are a print content screen of the Internet broadcast in S2303, the process advances to S2304. In S2304, the DTV temporarily saves the URI of the print content.

In S2305, the DTV executes the capture processing of the screen and temporarily saves the capture data as display data. Since the display data is used for the purpose of index display, a reduced-scale image may be saved. In S2306, the DTV appends an attribute of the PULL transfer type indirect print method to print data, and saves it as a module so as to manage the print data in association with the display data. In some cases, the DTV may save that module in an external storage device (e.g., a USB connection type external hard disk).

As a result of checking in S2302, if the screen display contents are a still screen of the data broadcast in S2307, the process advances to S2308.

In S2308, the DTV executes a hard copy of the still screen of the data broadcast, and temporarily saves a copy file as display data. Since the display data is used for the purpose of index display, a reduced-scale image may be saved. In S2309, the DTV edits the display data as that for printing to form a print document, and temporarily saves the print document.

In S2301, the DTV appends an attribute of the PUSH transfer type direct print method to the print document, and saves it as a module so as to manage the print document in association with the display data. In some cases, the DTV may save that module in an external storage device (e.g., a USB connection type external hard disk).

As a result of checking in S2302, if the screen display contents are a video screen of the digital broadcast in S2311, the process advances to S2312.

In S2312, the DTV captures video data on the digital broadcast screen, and temporarily saves the capture data as display data. Since the display data is used for the purpose of index display, a reduced-scale image may be saved.

In S2313, the DTV edits a display capture file as that for printing to form a print document, and temporarily saves the print document.

In S2314, the DTV appends an attribute of the PUSH transfer type direct print method to the print document, and saves it as a module so as to manage the print document in association with the display data. In some cases, the DTV may save that module in an external storage device (e.g., a USB connection type external hard disk).

In the above description, as for the display data, if data saved for printing can be used upon display, the display data need not be saved.

In this embodiment, the operation is switched by checking if the user presses the capture button within 10 seconds after the latest previous operation of the remote controller 1801. However, the present invention is not limited to this time period, and a different time period may be used. The present invention is not limited to switching of the operations depending on the time period, and the operation may be made based on the apparatus setting or user's choice.

<<Print Processing of Saved Print Data>>

The print processing of print data saved by the aforementioned processing will be described below.

When the user presses the print button 1804 of the remote controller 1801 while print data are saved, a view of the saved print data is index-displayed.

FIG. 24 shows an example of the screen which index-displays a view of print data.

In the screen of the DTV 101 in FIG. 24, reference numeral 2401 denotes an index display image of display data corresponding to print data of "(1) Print content mode (Internet broadcast)". Reference numeral 2402 denotes an index display image of display data corresponding to print data upon selection of "(2) Screen copy mode (copy of a still image)". Reference numeral 2403 denotes an index display image of display data corresponding to print data upon selection of "(4) Capture mode (capture of a broadcast video picture)". Reference numeral 2404 denotes a check box which represents the selection state (whether or not to print the print data) of each index display image; and 2405, a print start button.

When the user selects an index image to be printed using a select button (not shown) of the remote controller 1801 and then presses the print button 1804, a check mark indicating selection appears in the check box 2404 above that index image. In this way, when the user repetitively selects index images and then presses the print start button 2405, the DTV generates print data required to lay out and simultaneously print a plurality of selected index images. The DTV 101 issues a JOB required to print the generated print data using the printer. The printer interprets that JOB, generates an image obtained by laying out the plurality of images by fetching data with reference to a URI and using print data sent from the DTV 101, and starts the print processing.

Since each saved print data is appended with the attribute, the print data are managed to determine whether the data to be transferred is print data of the PUSH transfer type direct print method or that of the PULL transfer type indirect print method.

The print method of the selected print data is discriminated, and the transfer processing is done using the print method based on the discrimination result.

<<Effects>>

According to the first embodiment, during so-called zapping that the user frequency switches broadcast programs that he or she is viewing during, for example, TV commercials, if the user finds "information that he or she is interested in" from these programs, he or she can easily save it as print information. For this reason, the user can capture transient information without missing, thus allowing reliable information collection.

Since the button dedicated to the print data saving function is enabled for 10 seconds after the user switches a program by operating the remote controller, the print data saving operation is facilitated, thus improving convenience.

Since the capture data are saved as print information, the user can select and print them later all together. Also, since the information can be recorded using paper and the like, the user can carry them, thus improving convenience.

Even when the contents of print data have changed depending on broadcast programs, and the print method has changed accordingly, since the operation is standardized, the user can save print data by a simple operation, thus improving convenience.

Upon selection of the saved print data, a view of saved data is index-displayed on the DTV screen. However, some saved print data cannot be displayed since they are saved for printing. Even in such case, since an index display is made using display data related to such print data, the user can intuitively determine print data upon selection, thus improving convenience.

Since batch print can be done by a simple operation upon execution of printing, the convenience can be improved.

Second Embodiment

In the first embodiment, the screen display contents in the print data saving processing are checked based on broadcast modes. However, unlike in the first embodiment, this embodiment checks if information which is being broadcast includes print related data or printable data.

Figure 25A:
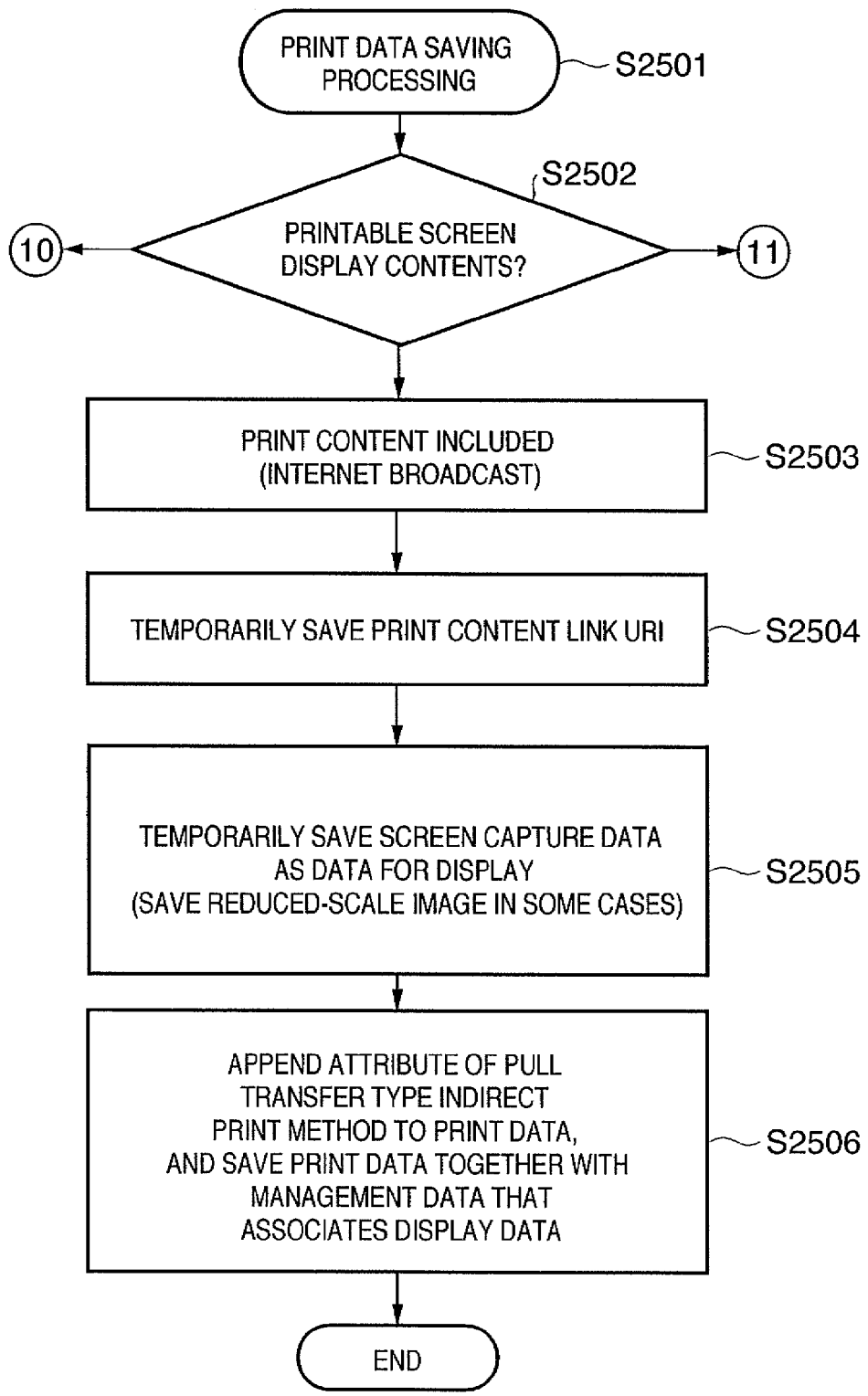
FIG. 25A is a flowchart showing the print data saving processing according to the second embodiment.
Figure 25C:
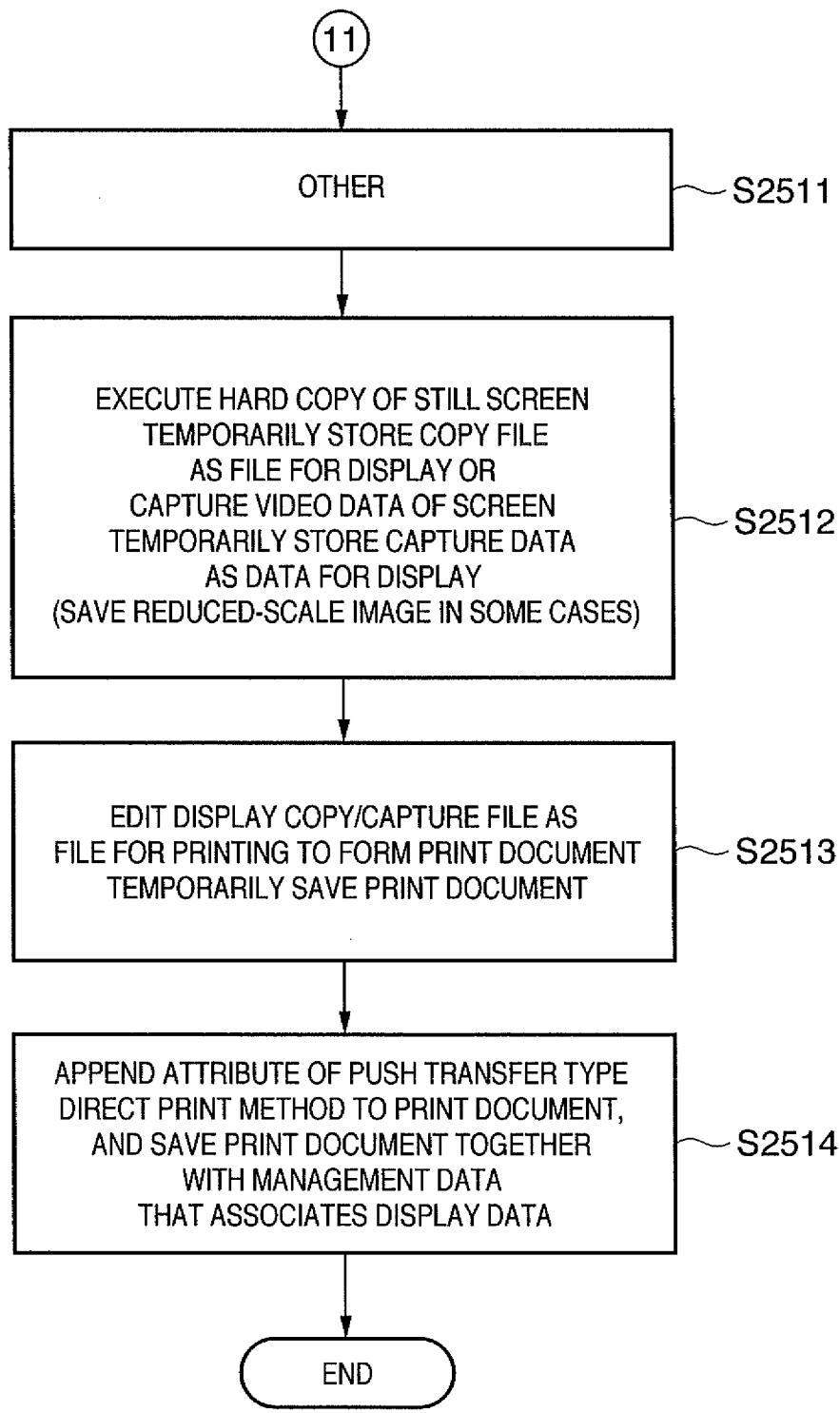
FIG. 25C is a flowchart showing the print data saving processing according to the second embodiment.

FIGS. 25A to 25C are flowcharts of the print data saving processing of the second embodiment.

Upon pressing of the capture button within 10 seconds after the previous operation of the remote controller 1801, the print data saving processing starts in S2501.

The DTV checks in S2502 if the screen display contents are printable. If the screen display contents include print contents of the Internet broadcast in S2503, the process advances to S2504. In S2504, the DTV temporarily saves the URIs of all print contents displayed on the screen.

In S2505, the DTV executes the capture processing of the screen and temporarily saves capture data as display data. Since the display data is used for the purpose of index display, a reduced-scale image may be saved. In S2506, the DTV appends an attribute of the PULL transfer type indirect print method to print data, and saves it as a module so as to manage the print data in association with the display data. In some cases, the DTV may save that module in an external storage device (e.g., a USB connection type external hard disk).

As a result of checking in S2502, if the screen display contents include printable information of the data broadcasting in S2507, the process advances to S2508.

In S2508, upon reception of BML data via the data broadcast, the DTV executes a screen print command to acquire a print document and temporarily saves the print document.

In S2509, the DTV parses the print document to extract display data, and temporarily saves the display data. Since the display data is used for the purpose of index display, a reduced-scale image may be saved. In S2510, the DTV appends an attribute of the PUSH transfer type direct print method to the print document, and saves it as a module so as to manage the print document in association with the display data. In some cases, the DTV may save that module in an external storage device (e.g., a USB connection type external hard disk).

As a result of checking in S2502, if the screen display contents correspond to another screen, the process advances to 2512.

In S2512, the DTV executes a hard copy of a still screen or executes the capture processing of video data of a digital broadcast screen, and temporarily saves a copy file/capture data as display data. Since the display data is used for the purpose of index display, a reduced-scale image may be saved.

In S2513, the DTV edits the display data as that for printing to form a print document, and temporarily stores the print document.

In S2514, the DTV appends an attribute of the PUSH transfer type direct print method to the print document, and saves it as a module so as to manage the print document in association with the display data. In some cases, the DTV may save that module in an external storage device (e.g., a USB connection type external hard disk).

In the above description, as for the display data, if data saved for printing can be used upon display, the display data need not be saved.

<<Effects>>

According to the second embodiment, if print data is obtained by capturing the screen, high print quality cannot be guaranteed. However, if print is done based on a print content or BML data, high quality can be expected, thus improving user's convenience.

Third Embodiment

This embodiment saves EPG information as display data and displays the EPG information upon index display, or it acquires a print content by the DTV, extracts image data from the print content, and saves the image data as display data.

In S2306 in FIG. 23A, display data in case of the print content screen of the Internet broadcast is generated by capturing the screen. However, this embodiment acquires EPG information from the SI information 806 in FIG. 8, and saves required information corresponding to the program as display data.

As another method, the following method may be used. That is, the DTV directly acquires print data from the URI of a print content, parses the print data to extract image data as that for display, and saves the display data.

The method of using EPG information as display data can also be used upon acquisition of another display data.

Furthermore, the display screen is often copy-protected. Upon saving such print data, since image data cannot be acquired, the DTV may inform the user of this using a beep tone, and may further save EPG information as print data/display data.

<<Effects>>

According to the third embodiment, upon selection of saved print data, each display data size can be reduced, and the memory can be effectively used, thus improving user convenience.

Since display information becomes more adequate, the user's operability can also be improved.

Fourth Embodiment

This embodiment is the case in which, for example, a hard disk recorder is connected to the DTV as an external storage device. If the hard disk recorder or the like is recording the digital broadcast, EPG information and time information at that time are saved by pressing the capture button 1803 in place of print data/display data.

Upon selection of print data, the DTV index-displays pieces of EPG information. When the user selects certain EPG information, the DTV activates the hard disk recorder or the like to extract a still image based on that EPG information and time information, saves the still image, edits the still image to form a print document, and executes PUSH transfer type direct print.

As another method, upon pressing of the capture button, the DTV marks data which is being recorded by the hard disk recorder, saves the marking position information as print data, and extracts a still image based on the marking information upon printing. The DTV saves the still image, edits it to form a print document, and executes direct print.

<<Effects>>

According to the fourth embodiment, using a recorder such as a hard disk recorder or the like, a memory required to save print data/display data can be saved, thus improving user's convenience.

Even during recording, print information can be saved. At the time of printing, the user can select print information from index display of the saved print information, thus improving user's convenience and operability.

Fifth Embodiment

In this embodiment, upon batch print of saved print data, the DTV is connected to a WEB server to confirm a connection state. If the connection state is not good, indirect print items of print data are postponed, and direct print items are preferentially printed.

<<Effects>>

According to the fifth embodiment, since the processing progresses efficiently in terms of time upon printing, the convenience can be improved.

Other Embodiments

The preferred embodiments of the present invention have been explained using their practical examples, and the present invention can be practiced in the forms of a system, apparatus, method, program, storage medium (recording medium), and the like. More specifically, the present invention can be applied to either a system constituted by a plurality of devices, or an apparatus consisting of a single equipment.

The objects of the present invention can be achieved by implementing some of the illustrated functional blocks and operations by either hardware circuits or software processing using a computer.

Note that the present invention includes a case wherein the invention is achieved by directly or remotely supplying a program of software that implements the functions of the aforementioned embodiments to a system or apparatus, and reading out and executing the supplied program code by a computer of that system or apparatus. In this case, a computer of the system or the like reads out and executes the program code.

Therefore, the program code itself installed in a computer to implement the functional processing of the present invention using the computer implements the present invention. That is, the present invention includes the computer program itself for implementing the functional processing of the present invention.

In this case, the form of program is not particularly limited, and an object code, a program to be executed by an interpreter, script data to be supplied to an OS, and the like may be used as long as they have the program function.

As a recording medium (storage medium) for supplying the program, for example, a flexible disk, hard disk, optical disk, magneto-optical disk, and the like may be used. In addition, MO, CD-ROM, CD-R, CD-RW, magnetic tape, nonvolatile memory card, ROM, DVD (DVD-ROM, DVD-R), and the like may be used.

As another program supply method, connection can be established to a home page on the Internet using a browser on a client computer, and the computer program itself of the present invention can be downloaded from the home page. Also, the program can be supplied by a compressed file containing an automatic installation function from the home page onto a recording medium such as a hard disk or the like. Also, the program code that forms the program of the present invention may be segmented into a plurality of files, which may be downloaded from different home pages. That is, the present invention includes a WWW server which makes a plurality of users download a program file required to implement the functional process of the present invention by a computer.

Also, a storage medium such as a CD-ROM or the like, which stores the encrypted program of the present invention, may be delivered to the user, and the user who has cleared a predetermined condition may be allowed to download key information that decrypts the program from a home page via the Internet. In this case, the user executes the encrypted program using that key information to be installed on a computer, thus implementing the present invention.

The functions of the aforementioned embodiments may be implemented not only by executing the readout program code by the computer but also by some or all of actual processing operations executed by an OS or the like running on the computer based on an instruction of that program.

Furthermore, the functions of the aforementioned embodiments may be implemented by some or all of actual processes executed by a CPU or the like arranged in a function expansion board or a function expansion unit, which is inserted into or connected to the computer, after the program read out from the recording medium is written in a memory of the expansion board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-252717, filed Aug. 31, 2005, which is hereby incorporated by reference herein in its entirety.

The invention claimed is:

1. A digital broadcast reception apparatus which allows a user to view a digital broadcast program, the reception apparatus comprising:

an output unit configured to receive and output a digital broadcast program on a display screen;

a storage unit configured to store printing data in response to a predetermined output instruction during viewing of the broadcast program;

a processing unit configured to generate still image data to be transmitted to a printer using print information stored in said storage unit; and a transmission unit configured to transmit, to the printer, a print request JOB including the print information stored in said storage unit, in response to a print start instruction after the predetermined output instruction, wherein when the predetermined output instruction is issued, (a) said storage unit stores URI information of a print content as the printing data if the broadcast program output by said output unit is a print content screen which is printable, (b) said storage unit stores captured data from a video frame as the printing data if the broadcast program output by said output unit is a video broadcast program which is not printable, and (c) when a recording apparatus which records the broadcast program is connected to the digital broadcast reception apparatus and is recording the broadcast program, then said storage unit stores EPG and time information of the digital broadcast program recorded in the recording apparatus as the printing data instead of the URI of the print content or the captured data of the video frame, and wherein said transmission unit (a) transmits the print request JOB in a PULL transfer type print method appending the URI information when the URI information of the print content is stored as the printing data, (b) transmits the print request JOB in a PUSH transfer type print method and the printing data when the captured video frame is stored as the printing data, and (c) transmits the print request JOB in a PUSH transfer type print method and still image data generated from the broadcast program recorded in the recording apparatus as the printing data when the EPG and time information of the broadcast program is stored as the printing data.

2. The reception apparatus according to claim 1, wherein said storage unit saves reduced-scale image data corresponding to the printing data in association with the printing data upon storing the printing data.

3. The reception apparatus according to claim 1, wherein when the captured data from the video frame is stored as the printing data and the display screen is copy-protected so as not to be captured, then said storage unit stores information which includes text extracted from broadcast program information included in a digital broadcast signal.

4. The reception apparatus according to claim 1, wherein the predetermined output instruction is issued by an operation from a remote controller.

5. An information content printing method in a digital broadcast reception apparatus which allows a user to view a digital broadcast program, the method comprising:
 an output step of receiving and outputting a digital broadcast program on a display screen;
 a storage step of storing printing data in response to a predetermined output instruction during viewing of the broadcast program;
 a processing step of generating still image data to be transmitted to a printer using print information stored in said storage unit; and
 a transmission step of transmitting, to the printer, a print request JOB including the print information stored in said storage unit in response to a print start instruction after the predetermined output instruction, wherein when the predetermined output instruction is issued, (a) URI information of a print content is stored as the printing data in said storage step if the broadcast program output by said output unit is a print content screen which is printable, (b) captured data from a video frame is stored as the printing data if the broadcast program output by said output unit is a video broadcast program which is not printable, and (c) when a recording apparatus which records the broadcast program is connected to the digital broadcast reception apparatus and is recording the broadcast program, EPG and time information of the digital broadcast program recorded in the recording apparatus are stored as the printing data in said storage step instead of the URI of the print content or the captured data of the video frame, and wherein the print request JOB in a PULL transfer type print method appending the URI information is transmitted in said transmission step when the URI information of the print content is stored as the printing data, the print request JOB in a PUSH transfer type print method and the printing data are transmitted in said transmission step when the captured video frame is stored as the printing data, and the print request JOB in a PUSH transfer type print method and still image data generated from the broadcast program recorded in the recording apparatus are transmitted in said transmission step as the printing data when the EPG and time information of the broadcast program is stored as the printing data.

6. The method according to claim 5, wherein in said storage step, reduced-scale image data corresponding to the printing data is saved in association with the printing data upon storing the printing data.

7. The method according to claim 5, wherein when the captured data from the video frame is stored as the printing data and the display screen is copy-protected so as not to be captured, then information which includes text extracted from broadcast program information included in a digital broadcast signal is stored in said storage step.

8. The method according to claim 5, wherein the predetermined output instruction is issued by an operation from a remote controller.

* * * * *